United States Patent
Kawashima

(10) Patent No.: US 12,316,974 B2
(45) Date of Patent: May 27, 2025

(54) INFORMATION PROCESSING DEVICE, INFORMATION PROCESSING METHOD, AND PROGRAM FOR CONTROLLING BRIGHTNESS OF A CAPTURED IMAGE

(71) Applicant: Sony Group Corporation, Tokyo (JP)

(72) Inventor: Manabu Kawashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 197 days.

(21) Appl. No.: 18/014,899

(22) PCT Filed: Jul. 2, 2021

(86) PCT No.: PCT/JP2021/025078
§ 371 (c)(1),
(2) Date: Jan. 6, 2023

(87) PCT Pub. No.: WO2022/014361
PCT Pub. Date: Jan. 20, 2022

(65) Prior Publication Data
US 2023/0254588 A1    Aug. 10, 2023

(30) Foreign Application Priority Data
Jul. 15, 2020   (JP) .................... 2020-121132

(51) Int. Cl.
*H04N 23/71* (2023.01)
*G06T 7/50* (2017.01)
(Continued)

(52) U.S. Cl.
CPC .............. *H04N 23/71* (2023.01); *G06T 7/50* (2017.01); *G06T 7/74* (2017.01); *G06V 10/60* (2022.01);
(Continued)

(58) Field of Classification Search
None
See application file for complete search history.

(56) References Cited

U.S. PATENT DOCUMENTS 5,621,462 A * 4/1997 Takahashi .............. H04N 23/72
348/229.1
2008/0138056 A1* 6/2008 Hosoi .................... G03B 7/091
396/164
(Continued)

FOREIGN PATENT DOCUMENTS

EP    2424227 A2 *  2/2012  ......... H04N 5/23222
JP    H11-205663 A    7/1999
(Continued)

*Primary Examiner* — Paul M Berardesca
(74) *Attorney, Agent, or Firm* — Paratus Law Group, PLLC

(57) ABSTRACT

There is provided an information processing device, an information processing method, and a program that enable appropriate detection of feature points by appropriately controlling exposure in a case of detecting feature points from a captured image and estimating a position and a posture of the self or the like. A position and a posture of an imaging unit or a mobile body that moves integrally with the imaging unit are estimated on the basis of feature points of a captured image captured by the imaging unit, and brightness of the captured image is controlled so that a ground image region included in the captured image has appropriate exposure.

17 Claims, 21 Drawing Sheets

(51) Int. Cl.
  *G06T 7/73*  (2017.01)
  *G06V 10/60*  (2022.01)
  *G06V 10/74*  (2022.01)
  *H04N 23/72*  (2023.01)

(52) U.S. Cl.
  CPC ........... *G06V 10/761* (2022.01); *H04N 23/72* (2023.01); *G06T 2207/30244* (2013.01)

(56) References Cited

U.S. PATENT DOCUMENTS

| | | |
|---|---|---|
| 2017/0078552 A1 | 3/2017 | Pochon |
| 2021/0029287 A1 | 1/2021 | Lee |
| 2021/0218875 A1 | 7/2021 | Saito |

FOREIGN PATENT DOCUMENTS

| | | |
|---|---|---|
| JP | 2000184271 A | 6/2000 |
| JP | 2001-356385 A | 12/2001 |
| JP | 2007-228201 A | 9/2007 |
| JP | 2009-157087 A | 7/2009 |
| JP | 2011-035705 A | 2/2011 |
| JP | 2011142488 A | 7/2011 |
| JP | 2012-075059 A | 4/2012 |
| JP | 2013160895 A | 8/2013 |
| JP | 2014-138277 A | 7/2014 |
| WO | WO 2019/163576 A1 | 8/2019 |
| WO | WO-2019188390 A1 | 10/2019 |
| WO | WO-2020054240 A1 | 3/2020 |

\* cited by examiner

FIG. 6
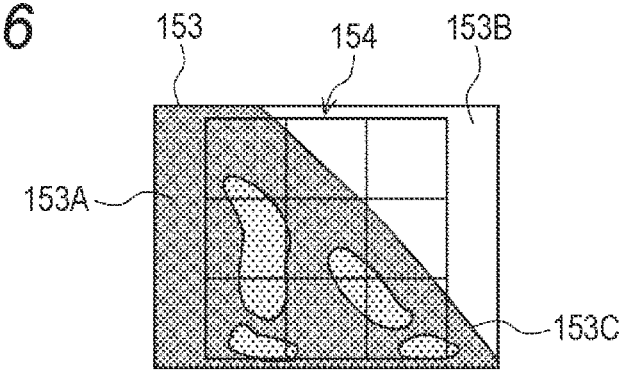
FIG. 7
| B00 | B01 | B02 |
|-----|-----|-----|
| B10 | B11 | B12 |
| B20 | B21 | B22 |
FIG. 8
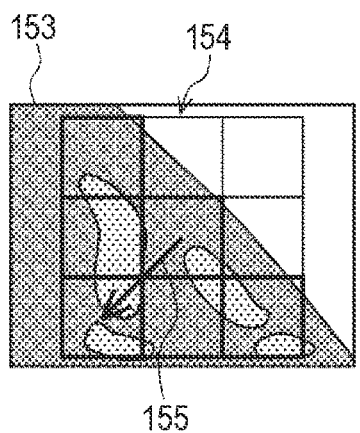

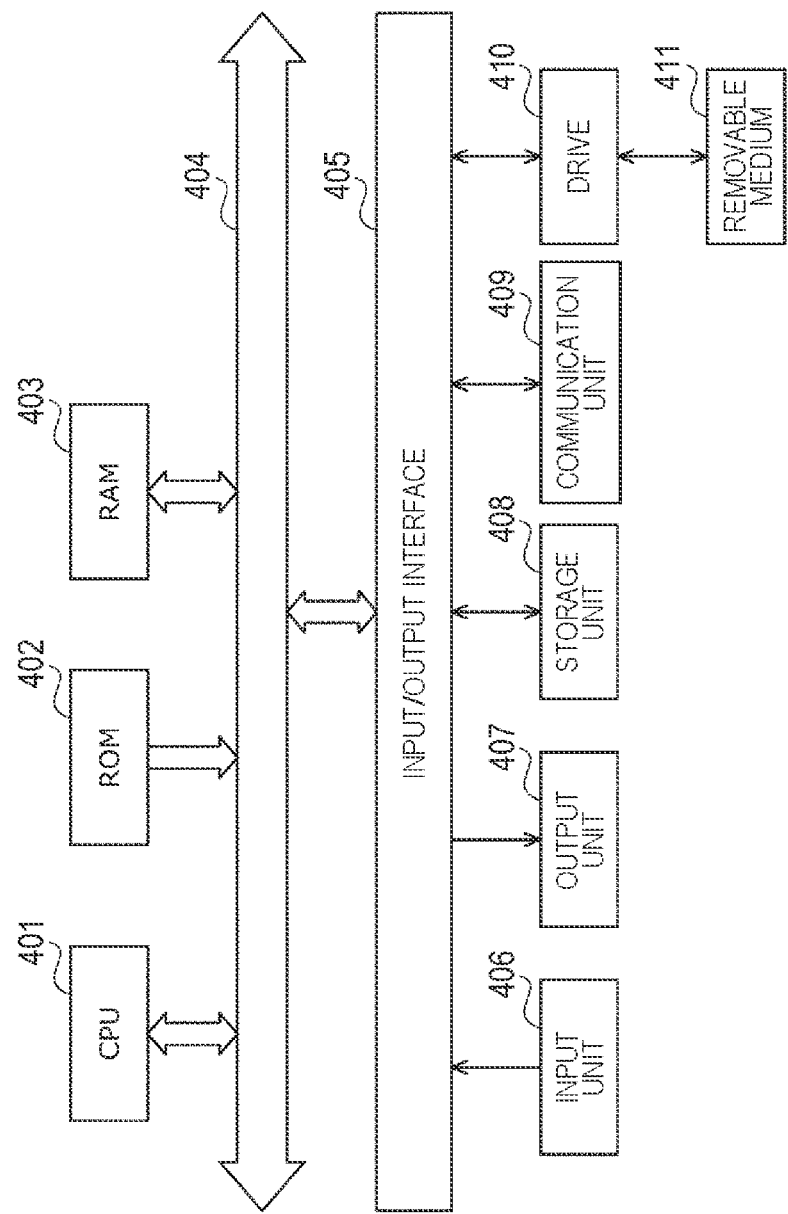

INFORMATION PROCESSING DEVICE, INFORMATION PROCESSING METHOD, AND PROGRAM FOR CONTROLLING BRIGHTNESS OF A CAPTURED IMAGE

CROSS REFERENCE TO PRIOR APPLICATION

This application is a National Stage Patent Application of PCT International Patent Application No. PCT/JP2021/025078 (filed on Jul. 2, 2021) under 35 U.S.C. § 371, which claims priority to Japanese Patent Application No. 2020-121132 (filed on Jul. 15, 2020), which are all hereby incorporated by reference in their entirety.

TECHNICAL FIELD

The present technology relates to an information processing device, an information processing method, and a program, and more particularly, to an information processing device, an information processing method, and a program that enable appropriate detection of feature points by appropriately controlling exposure in a case of detecting feature points from a captured image and estimating a position and a posture of the self or the like.

BACKGROUND ART

Patent Documents 1 to 5 disclose a technology for performing unique exposure control in a camera for a specific use such as an in-vehicle camera, a monitoring camera, or the like.

CITATION LIST

Patent Document

Patent Document 1: Japanese Patent Application Laid-Open No. 2009-157087
Patent Document 2: Japanese Patent Application Laid-Open No. H11-205663
Patent Document 3: Japanese Patent Application Laid-Open No. 2012-75059
Patent Document 4: Japanese Patent Application Laid-Open No. 2014-138277
Patent Document 5: Japanese Patent Application Laid-Open No. 2007-228201

SUMMARY OF THE INVENTION

Problems to be Solved by the Invention

In a case of detecting feature points from a captured image and estimating a position and a posture of the self or the like, there is a case where it is difficult to detect feature points because exposure is not appropriate.

The present technology has been made in view of such a situation, and makes it possible to appropriately control exposure and appropriately detect feature points in a case of detecting feature points from a captured image and estimating a position and a posture of the self or the like.

Solutions to Problems

An information processing device or a program according to the present technology is an information processing device including: a position/posture estimation unit that estimates a position and a posture of an imaging unit or a mobile body that moves integrally with the imaging unit on the basis of a feature point of a captured image captured by the imaging unit; and a control unit that controls brightness of the captured image so that a ground image region included in the captured image has appropriate exposure, or a program for causing a computer to function as such an information processing device.

An information processing method of the present technology is an information processing method in which an information processing device including a position/posture estimation unit and a control unit, in which the position/posture estimation unit estimates a position and a posture of an imaging unit or a mobile body that moves integrally with the imaging unit on the basis of a feature point of a captured image captured by the imaging unit, and the control unit controls brightness of the captured image so that a ground image region included in the captured image has appropriate exposure.

In the present technology, a position and a posture of an imaging unit or a mobile body that moves integrally with the imaging unit are estimated on the basis of feature points of a captured image captured by the imaging unit, and brightness of the captured image is controlled so that a ground image region included in the captured image has appropriate exposure.

BRIEF DESCRIPTION OF DRAWINGS

FIG. 6 is a diagram illustrating a photometry area set for an image area.
FIG. 7 is a diagram illustrating only the photometry area in FIG. 6.
FIG. 8 is a diagram illustrating a gravity direction calculated by a weight calculation unit.

FIG. 23 is a block diagram illustrating a configuration example of hardware of a computer that executes a series of processing by a program.

MODE FOR CARRYING OUT THE INVENTION

Hereinafter, embodiments of the present technology will be described with reference to the drawings.

<<Position/Posture Estimation System to which Present Technology is Applied>>

Figure 1:
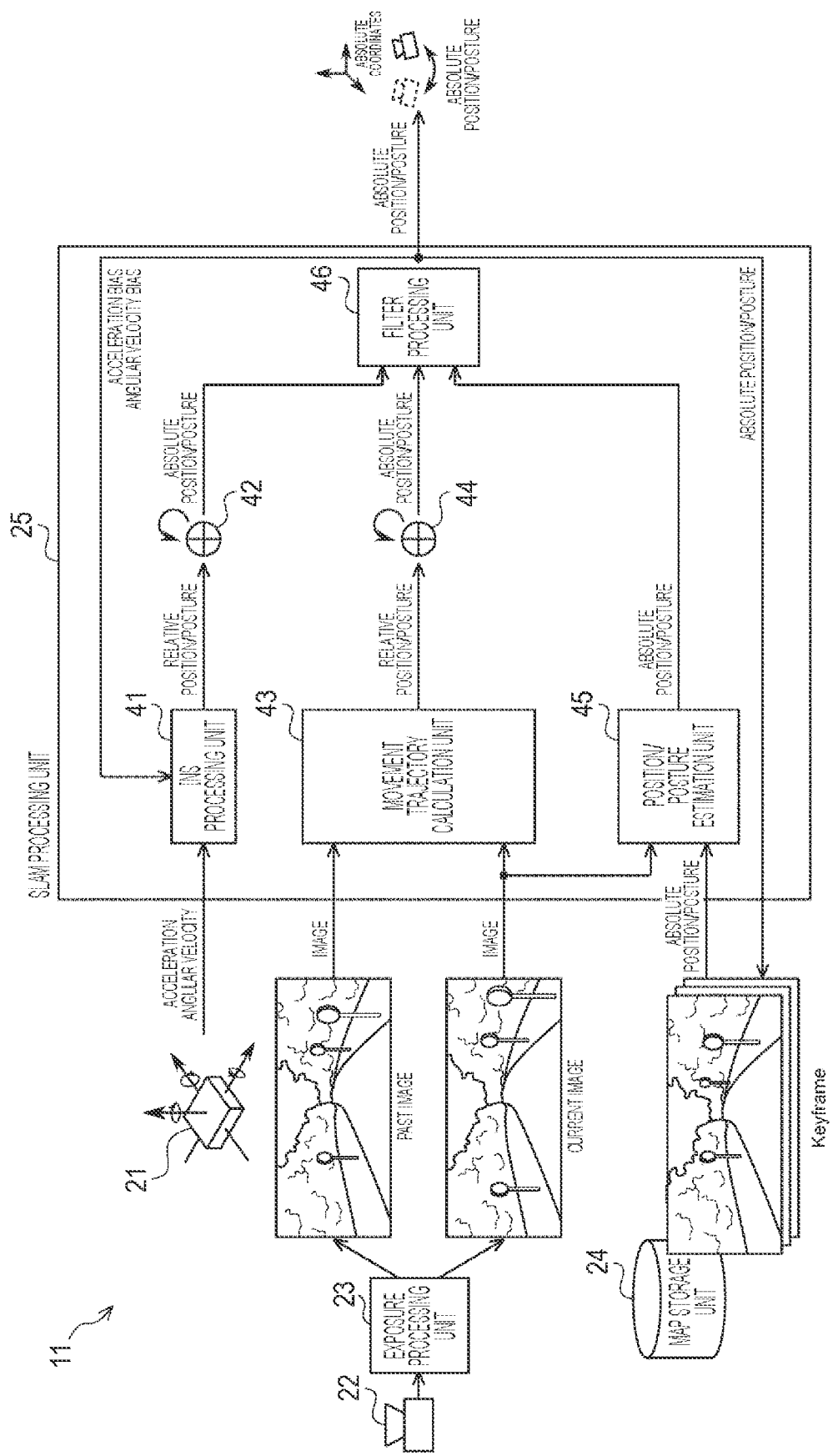
FIG. 1 is a block diagram schematically illustrating an overall configuration of a position/posture estimation system to which the present technology is applied.

FIG. 1 is a block diagram schematically illustrating an overall configuration of a position/posture estimation system to which the present technology is applied.

A position/posture estimation system 11 in FIG. 1 is, for example, mounted on a mobile body such as a drone (unmanned aerial vehicle), an automated vehicle, a robot, or the like, and detects (estimates) a position and a posture of the mobile body. Note that, hereinafter, the position and posture are also referred to as position/posture. Furthermore, assuming that the coordinate system set in the three-dimensional space in which the mobile body moves is an absolute coordinate system (world coordinate system), the position/posture of the mobile body represents the position/posture in the absolute coordinate system of the machine body coordinate system fixed to the mobile body. The machine body coordinate system may be an IMU coordinate system fixed to an IMU 21 described later, a camera coordinate system fixed to a camera 22 described later, or any coordinate system having a certain relationship therebetween. In the following description, the machine body coordinate system is a camera coordinate system, and the machine body coordinate system represents the camera coordinate system. Furthermore, it is assumed that a transformation matrix for transforming coordinates from the IMU coordinate system to the camera coordinate system is obtained in advance by calibration.

The position/posture estimation system 11 in FIG. 1 includes an inertial measurement unit (IMU) 21, a camera (imaging unit) 22, an exposure processing unit 23, a map storage unit 24, and a simultaneous localization and mapping (SLAM) processing unit 25.

The IMU 21 is fixed to the mobile body. The IMU 21 detects the acceleration in the orthogonal triaxial directions of the IMU coordinate system set by itself and the angular velocity around the orthogonal triaxial directions, and supplies them to the SLAM processing unit 25.

The camera 22 is fixed to the mobile body in a state in which a relative position and a relative posture with respect to the IMU 21 are unchanged. The camera 22 and the IMU 21 may be directly fixed or fixed via an intervening member.

The camera 22 includes an imaging element and a lens. The camera 22 converts an image of a subject formed on the light receiving surface of the imaging element by the lens from an optical image into an electric signal, and supplies the electric signal to the exposure processing unit 23. Images for each frame is repeatedly supplied from the camera 22 to the exposure processing unit 23 at a predetermined cycle.

The exposure processing unit 23 adjusts the brightness of the image from the camera 22 and supplies the adjusted image to the SLAM processing unit 25. Note that, as described later with reference to FIG. 10, the exposure processing unit 23 not only adjusts the brightness of the image output from the camera 22 by performing exposure control of the camera 22, but also includes processing in the case of adjusting the brightness of the image by signal processing (gain adjustment or the like) for the image from the camera 22.

The map storage unit 24 stores map information created by the SLAM processing unit 25. The map information includes key frame information and map point information.

The key frame information includes a plurality of key frames. The key frame is a frame used for estimating the position/posture of the camera 22 (camera coordinate system) in the absolute coordinate system among the images (frames) captured by the camera 22 in the SLAM processing. Furthermore, the key frame information includes a key frame ID for identifying each of the plurality of key frames, the position/posture of the camera 22 when each key frame is captured, and information on feature points included in each key frame.

The information of the feature point includes a two-dimensional position of each feature point in each key frame, a feature amount, and a map point ID of a map point corresponding to each feature point.

The feature point is a point of a characteristic portion in the image such as an edge portion, a corner portion, or the like in the key frame (image). Furthermore, each point on the subject in the three-dimensional space captured as a feature point in the key frame is a map point.

The map point information is information on a three-dimensional position of a map point corresponding to each feature point and a map point ID for identifying each map point.

The SLAM processing unit 25 estimates the position/posture of the mobile body (machine body coordinate system) on the basis of the acceleration and the angular velocity from the IMU 21, the image from the exposure processing unit 23, and the map information from the map storage unit 24. As described above, in the description of the present embodiment, since the camera coordinate system is the machine body coordinate system, the SLAM processing unit 25 estimates the position/posture of the camera 22 (camera coordinate system) as the position/posture of the mobile body. The SLAM processing unit 25 supplies the estimated position/posture of the mobile body (camera 22) to an external processing unit. The external processing unit is not limited to a processing unit that performs specific processing.

The SLAM processing unit 25 includes an inertial navigation system (INS) processing unit 41, an absolute position/posture calculation unit 42, a movement trajectory calculation unit (visual odometry) 43, an absolute position/posture calculation unit 44, a position/posture estimation unit 45, and a filter processing unit 46.

The INS processing unit 41 acquires the acceleration and the angular velocity from the IMU 21 every predetermined time (period at), and calculates a change amount (relative position/posture) of the position/posture of the IMU 21 (IMU coordinate system fixed to the IMU 21) in the absolute coordinate system that has occurred during the period Δt for each period at.

Furthermore, the INS processing unit 41 acquires the acceleration bias and the angular velocity bias estimated by the SLAM processing unit 25 from the SLAM processing unit 25. When calculating the relative position/posture, the INS processing unit 41 removes the acceleration bias and the angular velocity bias, which are bias noises included in the acceleration and the angular velocity from the IMU 21, by the acceleration bias and the angular velocity bias from the SLAM processing unit 25. When the relative position/posture is calculated, integration of the acceleration and the angular velocity from the IMU 21 is performed. Therefore, bias noise included in the acceleration and the angular velocity from the IMU 21 may also be integrated to cause an increase in error. The INS processing unit 41 removes bias noise to reduce errors.

The INS processing unit 41 supplies the calculated relative position/posture of the IMU 22 (IMU coordinate system) to the absolute position/posture calculation unit 42.

The absolute position/posture calculation unit 42 calculates a position/posture (absolute position/posture) of the mobile body (machine body coordinate system) in the absolute coordinate system on the basis of the relative position/posture of the IMU coordinate system from the INS processing unit 41, and supplies the position/posture to the filter processing unit 46. That is, every time the relative position/posture in the IMU coordinate system is supplied from the INS processing unit 41, the absolute position/posture calculation unit 42 converts the relative position/posture in the IMU coordinate system into the relative position/posture in the camera coordinate system which is the machine body coordinate system. Then, the absolute position/posture calculation unit 42 adds (takes into account) the relative position/posture of the camera coordinate system after the conversion to the absolute position/posture of the camera coordinate system calculated from the relative position/posture up to the previous time, and calculates the current absolute position/posture of the camera coordinate system.

The absolute position/posture calculation unit 42 supplies the calculated absolute position/posture of the camera coordinate system to the filter processing unit 46 as an absolute position/posture of the machine body coordinate system.

The movement trajectory calculation unit 43 acquires an image captured by the camera 22 from the exposure processing unit 23. Furthermore, the movement trajectory calculation unit 43 acquires images for each frame at a predetermined cycle. Note that, in FIG. 1, the image (past image) supplied from the exposure processing unit 23 at a predetermined past time and the image (current image) supplied at the current time are illustrated as being supplied in parallel to the movement trajectory calculation unit 43 for the sake of explanation, which are different from the actual situations.

On the basis of the past image and the current image from the exposure processing unit 23, the movement trajectory calculation unit 43 calculates the change amount (relative position/posture) of the position/posture of the camera 22 (camera coordinate system) that has occurred between the time when the past image was captured and the time when the current image was captured. The relative position/posture in the camera coordinate system is the relative position/posture of the mobile body (machine body coordinate system) in the present embodiment.

The movement trajectory calculation unit 43 supplies the calculated relative position/posture of the camera coordinate system to the absolute position/posture calculation unit 44.

The absolute position/posture calculation unit 44 calculates the position/posture (absolute position/posture) of the mobile body (camera 22) in the absolute coordinate system on the basis of the relative position/posture of the camera coordinate system from the movement trajectory calculation unit 43, and supplies the position/posture to the filter processing unit 46. That is, every time the relative position/posture of the camera coordinate system is supplied from the movement trajectory calculation unit 43, the absolute position/posture calculation unit 42 adds (takes into account) the relative position/posture to the absolute position/posture of the camera coordinate system calculated based on the relative position/posture up to the previous time to calculate the current absolute position/posture of the camera coordinate system.

The absolute position/posture calculation unit 44 supplies the calculated absolute position/posture of the camera coordinate system to the filter processing unit 46 as a position/posture of the machine body coordinate system.

The position/posture estimation unit 45 estimates the absolute position/posture of the camera coordinate system in the absolute coordinate system on the basis of the image (current image) from the exposure processing unit 23 and the key frame information and the map point information acquired from the map storage unit 24. The position/posture estimation unit 45 supplies the estimated absolute position/posture of the camera coordinate system to the filter processing unit 46 as an absolute position/posture of the machine body coordinate system.

The filter processing unit 46 estimates the absolute position/posture of the camera coordinate system (machine body coordinate system) such that the error covariance with respect to the true value is reduced by the processing of the Kalman filter, for example, on the basis of the absolute position/posture of the camera coordinate system (machine body coordinate system) respectively supplied from the absolute position/posture calculation unit 42, the absolute position/posture calculation unit 44, and the position/posture estimation unit 45. The filter processing unit 46 supplies the estimated absolute position/posture of the camera coordinate system (machine body coordinate system) to an external processing unit.

Furthermore, the filter processing unit 46 calculates bias noise (acceleration noise and angular velocity noise) included in the acceleration and the angular velocity detected by the IMU 22 on the basis of the estimated absolute position/posture of the camera coordinate system (machine body coordinate system), and supplies the bias noise to the INS processing unit 41.

Furthermore, the filter processing unit 46 supplies the estimated absolute position/posture to the map storage unit 24 (position/posture estimation unit 45), and supplies the key frame information and the map point information corresponding to the estimated absolute position/posture from the map storage unit 24 to the position/posture estimation unit 45.

(INS Processing Unit 41)

Figure 2:
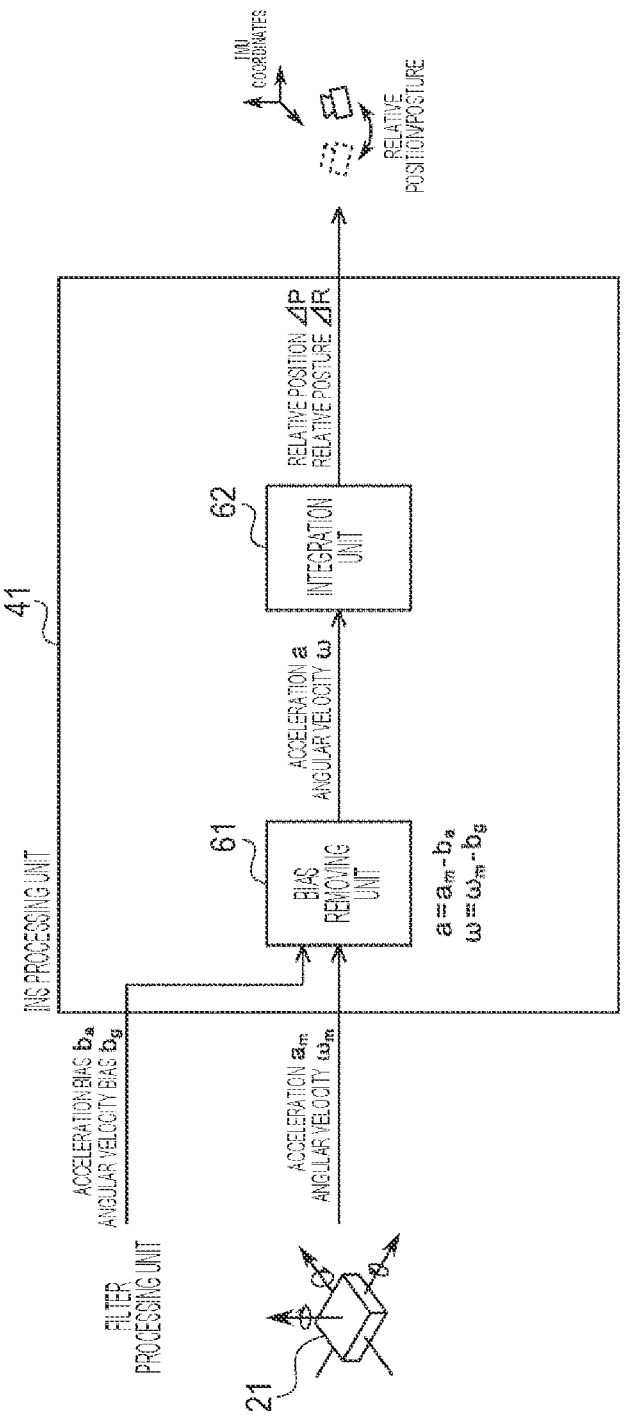
FIG. 2 is a block diagram illustrating a configuration of an INS processing unit.

FIG. 2 is a block diagram illustrating a configuration of the INS processing unit 41.

The INS processing unit 41 includes a bias removing unit 61 and an integration unit 62.

The bias removing unit 61 acquires the acceleration bias ba and the angular velocity bias bg from the filter processing unit 46 from the acceleration am and the angular velocity ωm from the IMU 21. Then, the bias removing unit 61 calculates the acceleration a obtained by removing the acceleration bias ba from the acceleration am by the following formula:

$$a = am - ba.$$

Furthermore, the filter processing unit 46 calculates the angular velocity ω obtained by removing the angular velocity bias bg from the angular velocity ωm by the following formula:

$$\omega = \omega m - bg.$$

The bias removing unit 61 supplies the calculated acceleration a and angular velocity ω to the integration unit 62.

The integration unit 62 executes processing corresponding to integration on the basis of the acceleration a and the angular velocity ω from the bias removing unit 61, calculates the relative position/posture of the IMU 21 (IMU coordinate system), and supplies the relative position/posture to the absolute position/posture calculation unit 42 in FIG. 1.

Specifically, the integration unit 62 acquires the acceleration and the angular velocity from the bias removing unit 61 every predetermined time (period Δt). The change of the posture (relative posture) of the IMU 21 in the period Δt is expressed by the following Formula (1) using quaternion.

[Mathematical Formula 1]

$$\Delta q = (q_x, q_y, q_z, q_w)^T \qquad (1)$$
$$= \begin{pmatrix} q \\ q_w \end{pmatrix}$$
$$= \begin{pmatrix} \frac{\overline{\omega}}{|\overline{\omega}|} \sin\left(\frac{1}{2}|\overline{\omega}|\Delta t\right) + \frac{\Delta t^2}{24} \omega_t \times \omega_{t+1} \\ \cos\left(\frac{1}{2}|\overline{\omega}|\Delta t\right) \end{pmatrix}$$

where $q = (qx, qy, qz)^T$, and the following Formula (2) is applied.

[Mathematical Formula 2]

$$\overline{\omega} = \frac{1}{2}(\omega_{t+1} + \omega_t) \qquad (2)$$

Note that the subscript t of the angular velocity ωt represents a time step (number), and the angular velocity ωt represents the t-th angular velocity ω acquired from the bias removing unit 61. Furthermore, the angular velocity ωt is a vector having an angular velocity around each of three axes of the IMU coordinate system detected by the IMU 21 as a component.

Furthermore, qx, qy, and qz of quaternion represent imaginary components, and qw of quaternion represents real components.

The integration unit 62 calculates a rotation matrix ΔR of the following Formula (3) expressed by using each quaternion component.

[Mathematical Formula 3]

$$\Delta R = I + 2q_w[q]_x + 2([q]_x)^2 \qquad (3)$$

where the following Formula (4) is applied.

[Mathematical Formula 4]

$$[q]_x = \begin{pmatrix} 0 & -q_z & q_y \\ q_z & 0 & -q_x \\ -q_y & q_x & 0 \end{pmatrix} \qquad (4)$$

The rotation matrix ΔR represents a change in the posture (relative posture) of the IMU 21 (IMU coordinate system) in a period Δt from the time step t to the time step t+1. Furthermore, the rotation matrix ΔR corresponds to a change in the posture (relative posture) of the mobile body (machine body coordinate system) in the absolute coordinate system.

Furthermore, the integration unit 62 calculates the relative position ΔP of the following Formula (5) using the rotation matrix ΔR calculated by Formula (3).

[Mathematical Formula 5]

$$\Delta P = V_t \Delta t + R_t \int\int \Delta R_T a_T dT^2 + \frac{1}{2} g \Delta t^2 \qquad (5)$$

where velocity Vt represents the velocity of the IMU 21 at time step t. The rotation matrix Rt represents the absolute posture of the IMU 21 (IMU coordinate system) at time step t in the absolute coordinate system. The acceleration at is a vector whose component is the acceleration in each of the three axial directions of the IMU coordinate system detected by the IMU 21 at the time step t. The gravitational acceleration g is a vector having a gravitational acceleration in each axial direction of the absolute coordinate system as a component.

The relative position ΔP represents a change in the position (relative position) of the IMU 21 (IMU coordinate system) in a period Δt from time step t to time step t+1. Furthermore, the relative position ΔP corresponds to a change in the position (relative position) of the mobile body (camera 22) in the absolute coordinate system.

(Movement Trajectory Calculation Unit 43)

Figure 3:
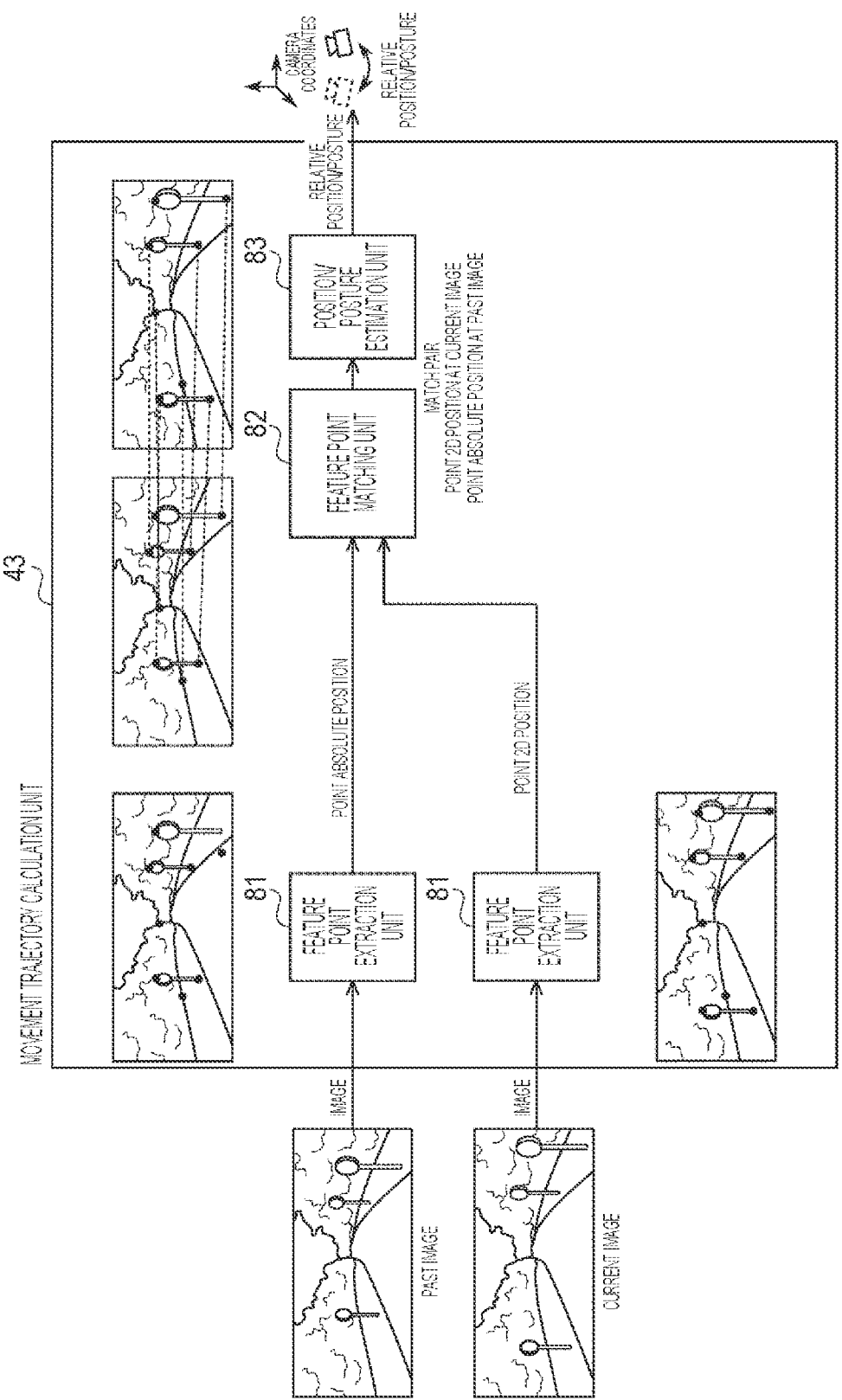
FIG. 3 is a block diagram illustrating a configuration of a movement trajectory calculation unit.

FIG. 3 is a block diagram illustrating a configuration of the movement trajectory calculation unit 43.

The movement trajectory calculation unit 43 includes a feature point extraction unit 81, a feature point matching unit 82, and a position/posture estimation unit 83.

The feature point extraction unit 81 extracts feature points from the image from the exposure processing unit 23 in FIG. 1. Although two feature point extraction units 81 are illustrated in FIG. 3, the feature point extraction units are actually the same processing unit. Of the two feature point extraction units 81, the upper side represents the feature point extraction unit 81 at a time a predetermined time (predetermined frame) before the current time, and the lower side represents the feature point extraction unit 81 at the current time.

The feature point extraction unit 81 on the upper side extracts a plurality of feature points from the past image supplied from the exposure processing unit 23 at a time a predetermined time (predetermined frame) before the current time.

The lower feature point extraction unit 81 extracts a plurality of feature points from the current image supplied from the exposure processing unit 23 at the current time.

The past image is an image a predetermined frame before the current image. After the current image is supplied to the feature point extraction unit 81, when a predetermined frame of time elapses and a new image is supplied to the feature point extraction unit 81, the current image becomes a past image.

Note that, when the feature point extraction unit 81 acquires the current image, the absolute coordinates of the feature points detected in the past image are already detected. The absolute coordinates of the feature point indicate a point on an entity (three-dimensional coordinates in an absolute coordinate system) corresponding to the feature point on the image.

The feature point extraction unit 81 supplies the position (two-dimensional coordinates in the image coordinate system) and absolute coordinates of the feature points detected in the past image on the image to the feature point matching unit 82.

Furthermore, the feature point extraction unit 81 supplies the position (two-dimensional coordinates in the image coordinate system) of the feature points detected in the current image on the image to the feature point matching unit 82.

The feature point matching unit 82 matches feature points corresponding to the same point on the entity among the feature points in the past image detected by the feature point extraction unit 81 and the feature points in the current image. In the matching processing in the feature point matching unit 82, since the time when the past image was captured and the time when the current image was captured are close to each other, each feature point in the past image may be tracked on the image. For example, the feature point matching unit 82 matches each feature point of the past image with a feature point of the current image adjacent to the feature point on the image coordinate system. However, the feature point matching unit 82 may perform matching processing on the basis of the feature amount of each feature point.

Furthermore, the feature point matching unit 82 supplies the two-dimensional coordinates in the absolute coordinate system of each feature point of the current image, the absolute position of each feature point of the past image matched with each feature point of the current image, and the two-dimensional coordinates in the image coordinate system of each feature point of the current image to the position/posture estimation unit 83.

On the basis of the two-dimensional coordinates in the absolute coordinate system of each feature point of the current image, the absolute position of each feature point of the past image matched with each feature point of the current image, and the two-dimensional coordinates in the image coordinate system of each feature point of the current image from the feature point matching unit 82, the position/posture estimation unit 83 estimates the change amount of the position/posture (relative position/posture) in which the camera 22 (camera coordinate system) has moved from the time when the past image was captured to the current time when the current image was captured. The position/posture estimation unit 83 supplies the estimated relative position/posture of the camera coordinate system to the absolute position/posture calculation unit 44 in FIG. 1.

(Position/Posture Estimation Unit 45)

Figure 4:
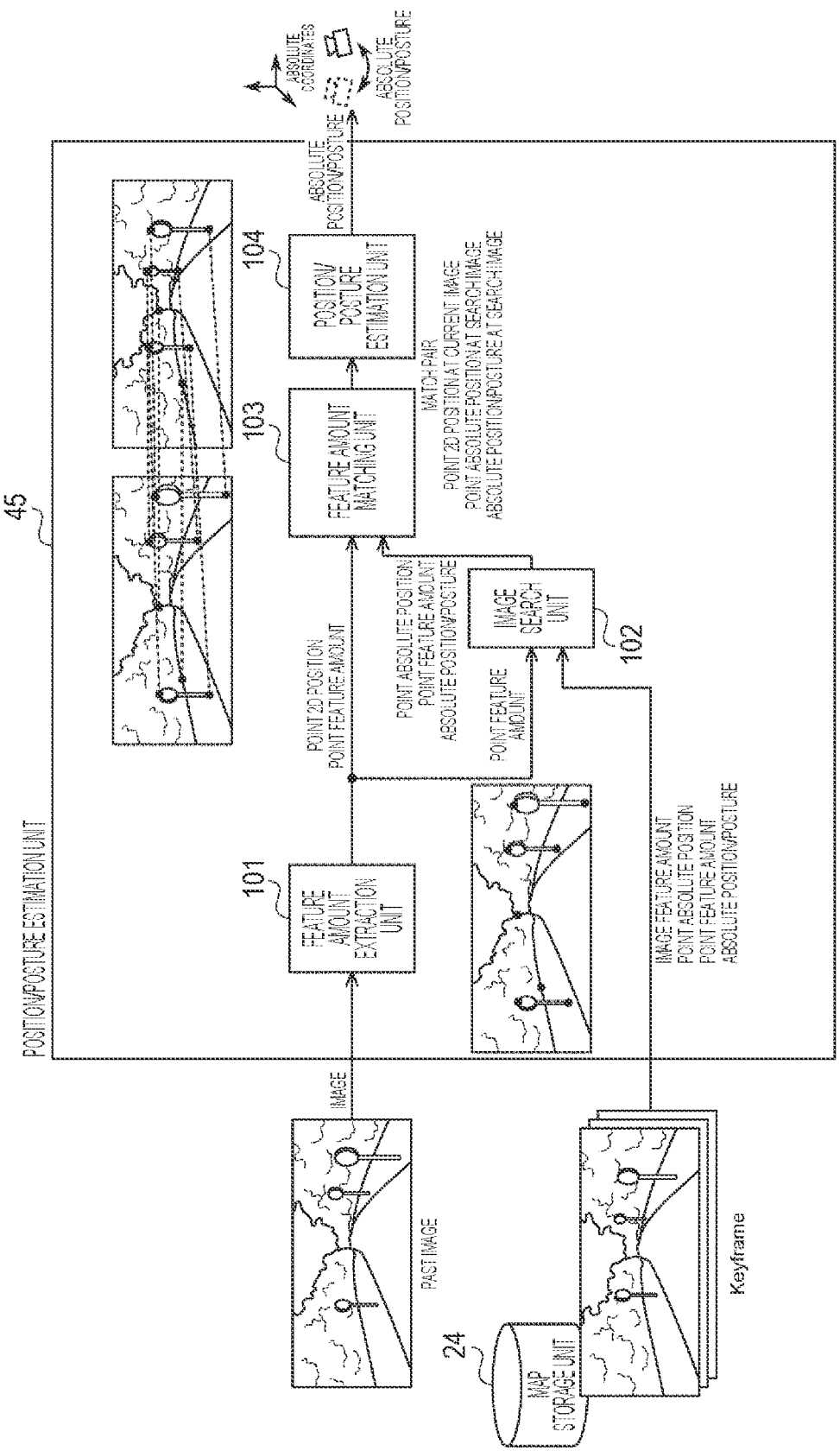
FIG. 4 is a block diagram illustrating a configuration of a position/posture estimation unit.

FIG. 4 is a block diagram illustrating a configuration of the position/posture estimation unit 45.

The position/posture estimation unit 45 includes a feature amount extraction unit 101, an image search unit 102, a feature amount matching unit 103, and a position/posture estimation unit 104.

The feature amount extraction unit 101 extracts a feature point from the image from the exposure processing unit 23 in FIG. 1 and extracts a feature amount of each feature point. The feature amount extraction unit 101 supplies the position (two-dimensional coordinates in the image coordinate system) of the extracted feature point on the image and the feature amount of each extracted feature point to the feature amount matching unit 103, and supplies the feature amount of each extracted feature point to the image search unit 102.

On the basis of the feature amount of each feature point from the feature amount extraction unit 101, the image search unit 102 searches the map storage unit 24 for a key frame including the most feature points of the current image. That is, the image search unit 102 detects a feature amount matching the feature amount of each feature point of the current image among the feature amounts of the feature points of the respective key frames included in the key frame information stored in the map storage unit 24. Then, the image search unit 102 detects the key frame ID of the key frame including the most feature points of the detected feature amount. The image search unit 102 acquires the key frame with the detected key frame ID, the two-dimensional coordinates of each feature point included in the key frame in the image coordinate system, and the absolute position/posture of the camera coordinate system when the key frame is captured from the key frame information in the map storage unit 24.

Furthermore, the image search unit 102 acquires the absolute coordinates of the map point of the map point ID associated with the feature point included in the key frame of the detected key frame ID from the map point information of the map storage unit 24.

The image search unit 102 supplies the information acquired from the map storage unit 24 to the feature amount matching unit 103.

Among the feature points of the current image from the feature amount extraction unit 101 and the feature points of the key frame from the image search unit 102, the feature amount matching unit 103 matches the feature points whose feature amounts match each other. That is, the feature amount matching unit 103 performs matching between feature points corresponding to the same map points.

The feature amount matching unit 103 supplies the two-dimensional coordinates in the absolute coordinate system of each feature point of the current image to the position/posture estimation unit 104. Furthermore, the feature amount matching unit 103 supplies the absolute position of each feature point (three-dimensional coordinates in the absolute coordinate system of the map point corresponding to each feature point) of the key frame matched with each feature point of the current image, the two-dimensional coordinates in the image coordinate system of each feature point of the key frame, and the absolute position/posture of the camera 22 (camera coordinate system) when the key frame is captured to the position/posture estimation unit 104.

The position/posture estimation unit 104 estimates the absolute position/posture of the camera coordinate system when the current image is captured on the basis of the two-dimensional coordinates of each feature point of the current image, the absolute position of each feature point of the key frame matched with each feature point of the current image, the two-dimensional coordinates of each feature point of the key frame, and the absolute position/posture of the camera 22 (camera coordinate system) when the key frame is captured from the feature amount matching unit 103. The position/posture estimation unit 104 supplies the estimated absolute position/posture of the camera coordinate system to the filter processing unit 46 in FIG. 1.

Furthermore, in a case where there is a feature point whose absolute coordinates are not specified in the current image, the position/posture estimation unit 104 calculates the absolute coordinates of the new feature point. The position/posture estimation unit 83 sets the current image as a key frame of the key frame information, and registers the absolute coordinates of the calculated feature point in the map storage unit 24 as the absolute coordinates of the map point of the map point information.

(Exposure Processing Unit 23)

Figure 5:
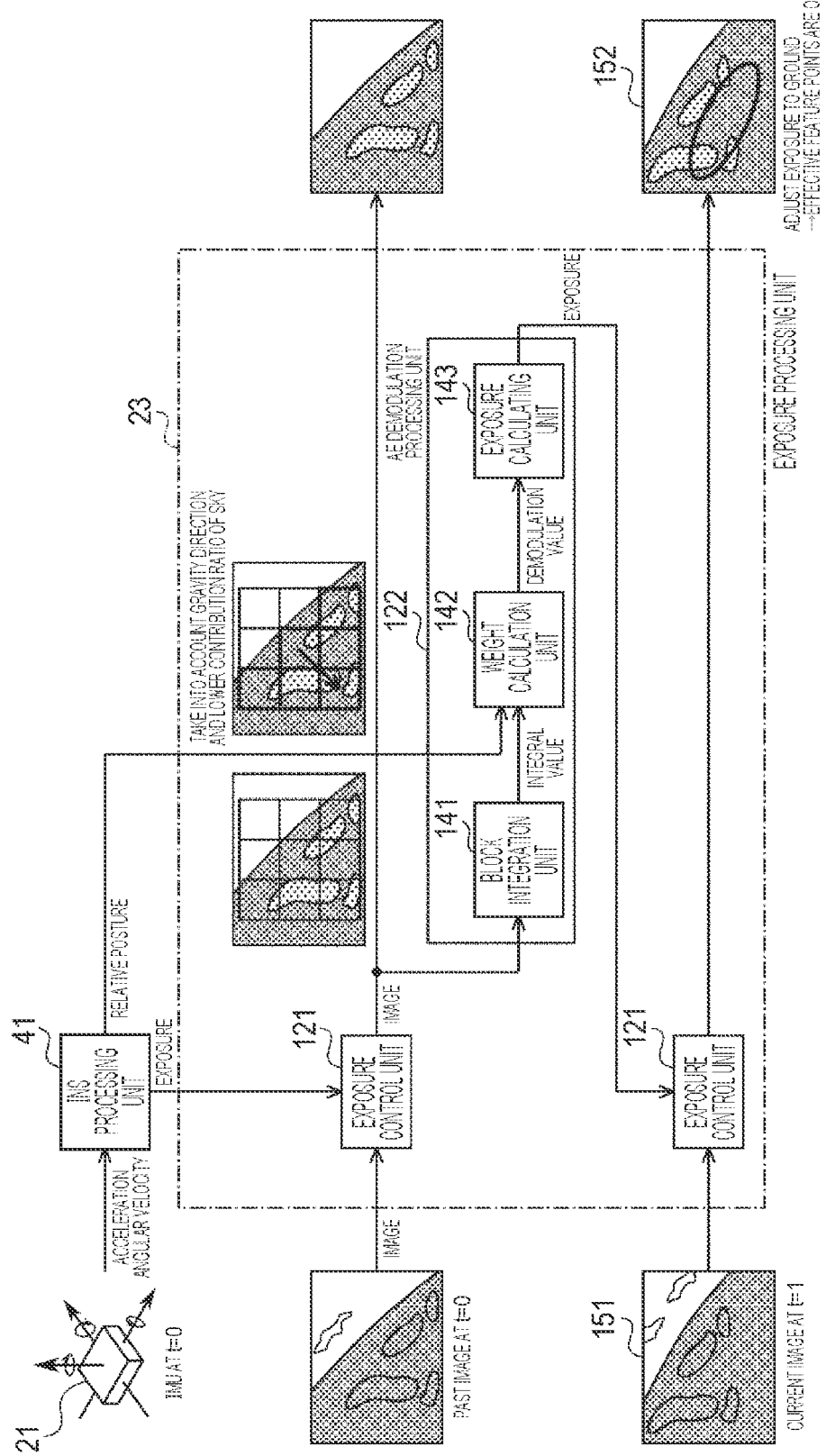
FIG. 5 is a block diagram illustrating a configuration of a first embodiment of an exposure processing unit.

FIG. 5 is a block diagram illustrating a configuration of a first embodiment of the exposure processing unit 23.

The exposure processing unit 23 includes an exposure control unit 121 and an AE demodulation processing unit 122.

The exposure control unit 121 controls the brightness of the image from the camera 22 in FIG. 1, and supplies the controlled image to the movement trajectory calculation unit 43 and the position/posture estimation unit 45 of the SLAM processing unit 25 in FIG. 1. Although two exposure control units 121 are illustrated in FIG. 5, the two exposure control units 121 are actually the same processing unit. Of the two exposure control units 121, the upper side represents the exposure control unit 121 at a time a predetermined time (predetermined frame) before the current time, and the lower side represents the exposure control unit 121 at the current time.

The upper exposure control unit 121 controls the brightness of the past image supplied from the camera 22 a predetermined time (predetermined frame) before the current time.

The lower exposure control unit 121 controls the brightness of the current image (current image 151) supplied from the camera 22 at the current time.

The past image is an image a predetermined frame before the current image 151. After the current image is supplied to the exposure control unit 121, when a predetermined frame of time elapses and a new image is supplied to the exposure control unit 121, the current image 151 becomes a past image.

Note that, in the following description, it is assumed that the exposure control unit 121 performs exposure control for each image (for each frame) for one frame supplied from the camera 22. Then, the cycle in which the image of one frame is supplied is set to one time step, the time step t when the past image is captured is set to 0, and the time step t when the current image is captured is set to 1.

Furthermore, as described later with reference to FIG. 10, the exposure control unit 121 not only adjusts the brightness of the image output from the camera 22 by performing exposure control of the camera 22, but also includes processing in the case of adjusting the brightness of the image by signal processing (gain adjustment or the like) for the image from the camera 22.

Furthermore, the exposure control unit 121 supplies the controlled image to the AE demodulation processing unit 122. Note that, in FIG. 5, the current image 151 output from the lower exposure control unit 121 is not supplied to the AE demodulation processing unit 122, but similarly to the past image output from the upper exposure control unit 121, the current image output from the lower exposure control unit 121 is supplied to the AE demodulation processing unit 122. That is, regardless of the processing time, the image output from the exposure control unit 121 is supplied to the AE demodulation processing unit 122.

The AE demodulation processing unit 122 calculates an appropriate exposure value (light exposure value) on the basis of the brightness of the past image from the exposure control unit 121, and supplies the exposure value to the exposure control unit 121. The exposure control unit 121 controls the brightness of the current image 151 on the basis of the exposure value supplied from the AE demodulation processing unit 122.

Furthermore, the AE demodulation processing unit 122 calculates an appropriate exposure value for the images sequentially supplied from the camera 22, and sequentially supplies the exposure values to the exposure control unit 121. The exposure control unit 121 controls the brightness of the images according to the exposure values sequentially supplied from the AE demodulation processing unit 122. Therefore, the exposure is controlled according to the change in the brightness of the subject captured by the camera 22.

The AE demodulation processing unit 122 includes a block integration unit 141, a weight calculation unit 142, and an exposure calculating unit 143.

The block integration unit 141 sets a photometry area in which rectangular small regions are vertically and horizontally arranged with respect to a region of an image (image area) for one frame supplied from the exposure control unit 121. Note that each small region is referred to as a block.

FIG. 6 is a diagram illustrating a photometry area set for an image area.

In FIG. 6, an image 153 illustrates an image supplied from the exposure control unit 121 to the block integration unit 141. The image area of the image 153 includes, for example, an image of the land 153A, an image of the sky 153B, and an image of the horizon 153C which is a boundary between the images.

The photometry area 154 is set within the image area of the image 153. The photometry area 154 is smaller than the image area and is set at the center in the image area. However, the entire image area may be used as the photometry area.

FIG. 7 is a diagram illustrating only the photometry area 154 of FIG. 6.

The photometry area 154 is divided into, for example, nine rectangular blocks B00 to B22. Each of the blocks B00 to B22 is vertically and horizontally arranged in 3×3. Each of the blocks B00 to B22 includes a plurality of pixels. Note that the number and arrangement of blocks dividing the photometry area 154 may be different from those in the case of FIG. 7. Furthermore, the size and shape of each of the blocks B00 to B22 may not be the same.

The block integration unit 141 adds the luminance values of the pixels included in each of the blocks B00 to B22 in the photometry area 152. As a result of the addition, a value obtained for each of the blocks B00 to B22 is referred to as a block integral value.

In FIG. 5, the block integration unit 141 supplies the calculated block integral value of each of the blocks B00 to B22 to the weight calculation unit 142.

The weight calculation unit 142 acquires the block integral value of each of the blocks B00 to B22 from the block integration unit 141.

Furthermore, the weight calculation unit 142 acquires the relative position/posture of the IMU coordinate system, which is the change amount of the position/posture of the IMU 21, from the INS processing unit 41 illustrated in FIGS. 1 and 2.

Furthermore, the weight calculation unit 142 acquires the absolute position/posture of the camera coordinate system estimated by the filter processing unit 46 of the SLAM processing unit 25 in FIG. 1.

Although details will be described later, the weight calculation unit 142 calculates the absolute position/posture of the camera coordinate system at the current time on the basis of the relative position/posture of the IMU coordinate system from the INS processing unit 41 and the absolute position/posture of the camera coordinate system from the filter processing unit 46, and calculates the gravity vector representing the gravity direction and the magnitude in the image coordinate system.

FIG. 8 is a diagram illustrating a gravity vector calculated by the weight calculation unit 142.

FIG. 8 illustrates the image 153 and the photometry area 154 illustrated in FIG. 7. In the image area of the image 153, the gravity vector 155 calculated by the weight calculation unit 142 is illustrated. The start point of the gravity vector 155 is the center of the image 153 (the center of the photometry area 154). The gravity vector 155 represents the acquired gravity direction on the image 153, that is, the direction of the ground (earth). Note that the gravity vector 155 will be described later.

The weight calculation unit 142 decides a weight (weight coefficient) to be multiplied by the block integral value of each of the blocks B00 to B22 in the photometry area 154 on the basis of the gravity vector 155, and calculates a weighted sum. At this time, the weight calculation unit 142 increases the weight for the block set in the ground image region and decreases the weight for the block set in the sky image region. As a result, exposure in which the influence of the brightness of the sky image portion is reduced is performed.

The weight calculation unit 142 supplies the calculated weighted sum to the exposure calculating unit 143 as a demodulation value of luminance indicating the brightness of the image.

The exposure calculating unit 143 calculates an appropriate exposure value on the basis of the demodulation value from the weight calculation unit 142 and supplies the exposure value to the exposure control unit 121.

(Comparative Embodiment of Exposure Processing Unit 23)

Figure 9:
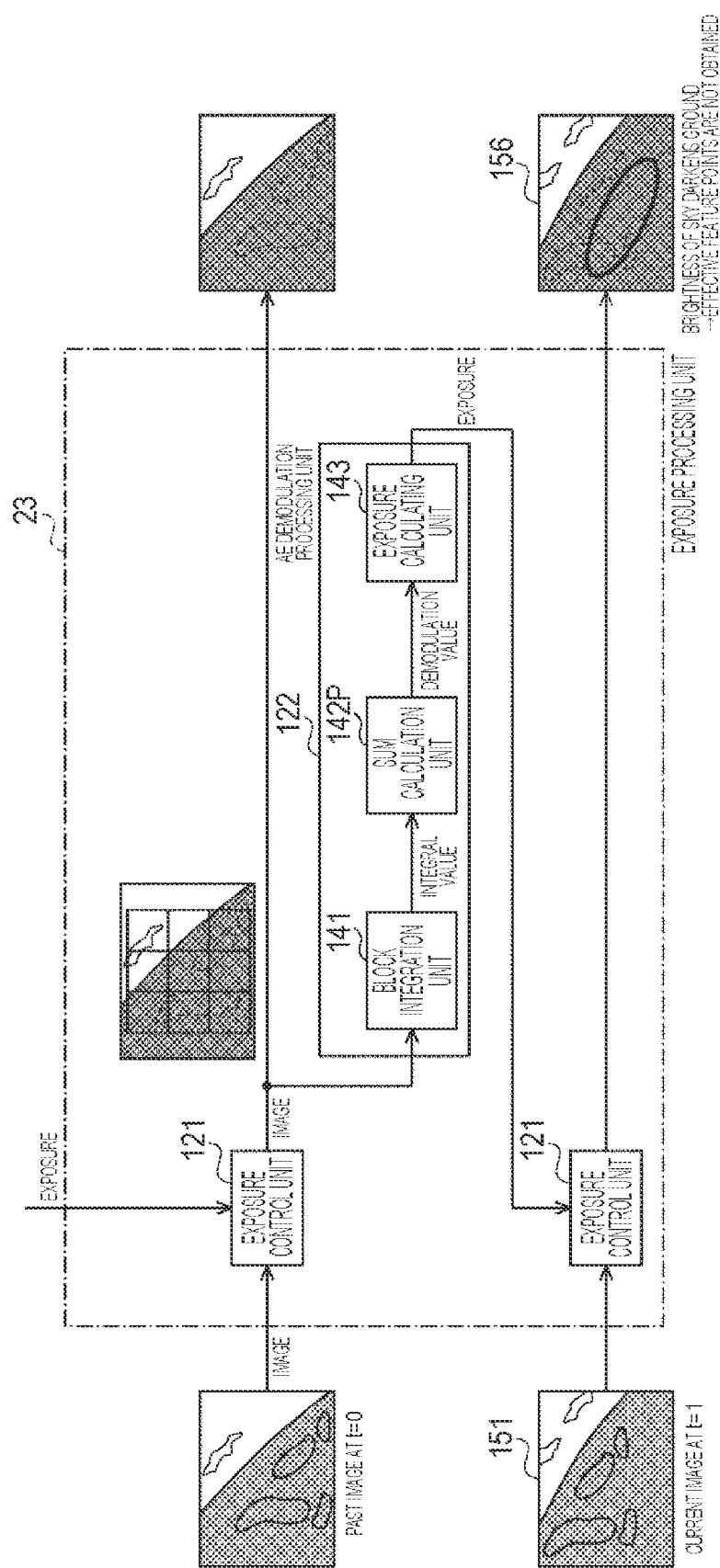
FIG. 9 is a diagram illustrating a comparative embodiment of an exposure processing unit.

FIG. 9 is a diagram illustrating a comparative embodiment of the exposure processing unit 23.

Note that, in the drawing, portions corresponding to those of the exposure processing unit 23 in FIG. 5 are denoted by the same reference numerals, and the description thereof will be omitted.

The exposure processing unit 23 in FIG. 9 includes an exposure control unit 121 and an AE demodulation processing unit 122. The AE demodulation processing unit 122 in FIG. 9 includes a block integration unit 141, a sum calculation unit 142P, and an exposure calculating unit 143. Therefore, the exposure processing unit 23 in FIG. 9 is common to the case in FIG. 5 in including the exposure control unit 121, the AE demodulation processing unit 122, the block integration unit 141, and the exposure calculating unit 143. However, the exposure processing unit 23 in FIG. 9 is different from the case of FIG. 5 in that the sum calculation unit 142P is provided instead of the weight calculation unit 142 of FIG. 5.

The sum calculation unit 142P in the exposure processing unit 23 in FIG. 9 calculates the sum of the block integral values of the blocks B00 to B22 supplied from the block integration unit 141.

The sum calculation unit 142P supplies the calculated sum to the exposure calculating unit 143 as a demodulation value of the luminance indicating the brightness of the image.

According to the comparative embodiment of the exposure processing unit 23 in FIG. 9, in a case where a sky image is included in the image supplied to the exposure processing unit 23, the sky image portion is bright, and thus, the sum obtained by adding the block integral values of the blocks B00 to B22 of the photometry area 154 as they are is also increased. Therefore, the demodulation value supplied from the sum calculation unit 142P to the exposure calculating unit 143 also increases, and the appropriate exposure value supplied from the exposure calculating unit 143 to the exposure control unit 121 also increases.

As a result, since the exposure control unit 121 controls the exposure in the direction of darkening the image, instead of an image in which a cloud or the like existing in the sky is easily recognized, the ground image becomes dark as a whole, and an image in which it is difficult to recognize an object existing on the ground is obtained. That is, the contrast of the image on the ground is less likely to increase. Since the sky is considered to exist at infinity, the feature point detected in the sky has unclear depth information and cannot be used to estimate the position/posture.

Normally, exposure control is performed so that contrast remains on the ground and in the sky as much as possible, as in an image that is preferable for human viewing. As a result, for example, since the contrast on the ground useful for SLAM is reduced and useless sky contrast is left, it can be said that the control is poor in information efficiency for position/posture estimation.

Furthermore, for the SLAM technology for estimating the position/posture of the mobile body using the image captured by the camera 22, correctly detecting the feature point from the image captured by the camera 22 is an important matter for securing performance. Therefore, increasing the contrast on the ground where useful feature points exist is a major problem for the SLAM technology.

In the exposure processing unit 23 of FIG. 5, the brightness of the image detected by the photometry area 154 is not easily affected by the sky image, and the brightness of the image is controlled so as to increase the contrast of the image on the ground.

(Weight Calculation Unit 142)

Figure 10:
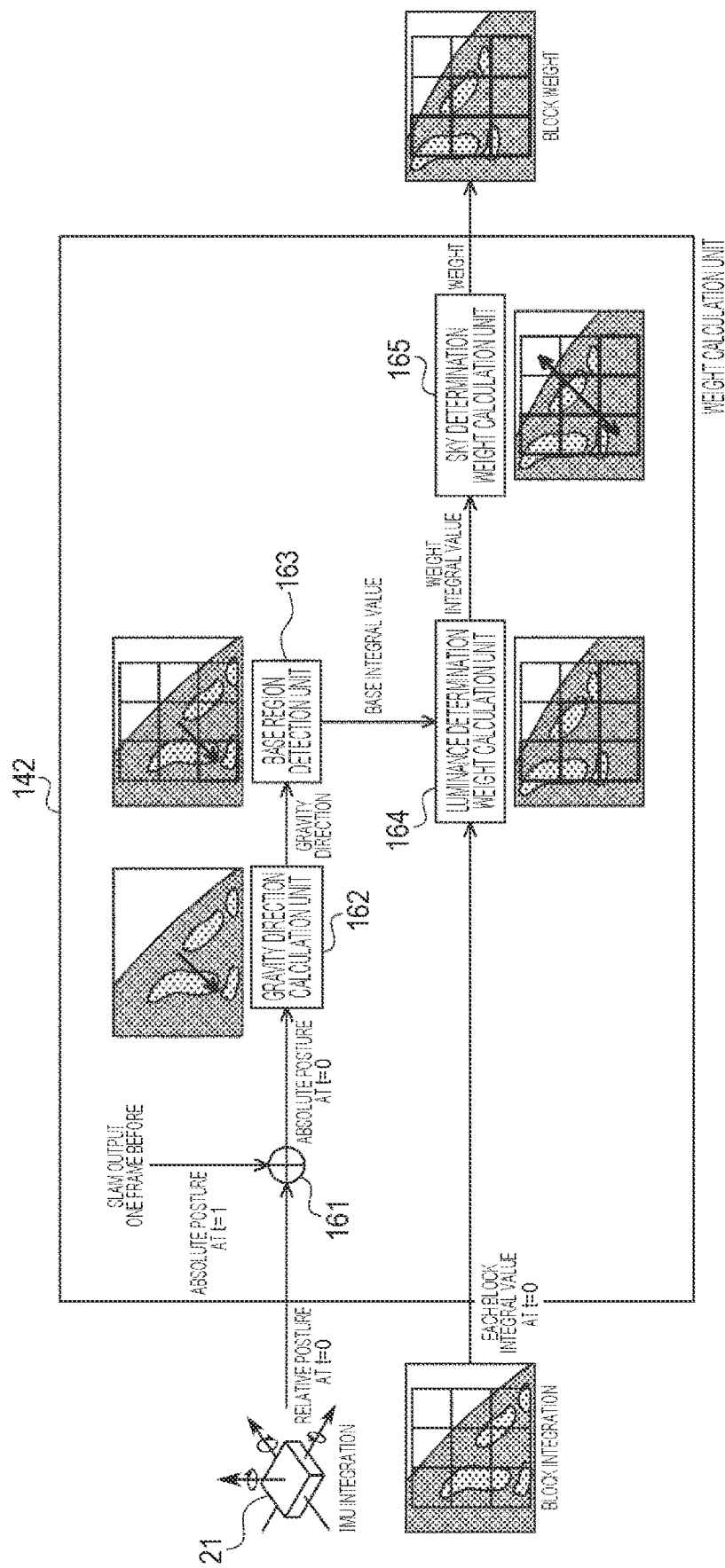
FIG. 10 is a block diagram illustrating a configuration of a weight calculation unit in FIG. 5.

FIG. 10 is a block diagram illustrating a configuration of the weight calculation unit 142 in FIG. 5.

The weight calculation unit 142 includes an absolute posture calculation unit 161, a gravity direction calculation unit 162, a base region detection unit 163, a luminance determination weight calculation unit 164, and a sky determination weight calculation unit 165.

The absolute posture calculation unit 161 acquires, from the INS processing unit 41 illustrated in FIGS. 1 and 5, the relative posture $\Delta R$ of the IMU coordinate system, which is the change amount of the position/posture of the IMU 21 from the time (time step t is set to −1) when the SLAM processing unit 25 (filter processing unit 46) in FIG. 1 previously estimated the absolute posture of the camera coordinate system (machine body coordinate system) to the current time (time step t is set to 0). Note that the INS processing unit 41 is omitted in FIG. 10.

Furthermore, the absolute posture calculation unit 161 acquires the absolute posture $_W R_{C(t=-1)}$ of the camera coordinate system (machine body coordinate system), which is the output of the SLAM processing unit 25, from the filter processing unit 46 in FIG. 1 when the time step t is −1. $_W R_{C(t=-1)}$ is a rotation matrix that transforms coordinates from the camera coordinate system to the absolute coordinate system (world coordinate system) at time step t=−1.

On the basis of the relative posture $\Delta R$ of the IMU coordinate system acquired from the IMU 21 and the absolute posture $_W R_{C(t=-1)}$ of the camera coordinate system acquired from the filter processing unit 46, the weight calculation unit 142 calculates the absolute posture $_W R_{C(t=0)}$ of the camera coordinate system at the current time (time step t is 0) by the following Formula (6). $_W R_{C(t=0)}$ is a rotation matrix that transforms coordinates from the camera coordinate system to the absolute coordinate system (world coordinate system) at time step t=0.

$$_{W}R_{C(t=0)} = {_{W}R_{C(t=-1)}} (_{I}R_{C})^{T} \Delta R \quad (6)$$

Note that $(_{I}R_{C})^{T}$ is a transposed matrix of a rotation matrix $(_{I}R_{C})$ that converts coordinates from the camera coordinate system to the IMU coordinate system. $(_{I}R_{C})^{T}$ is determined in advance by calibration.

The absolute posture calculation unit 161 supplies the calculated absolute posture $_{W}R_{C(t=0)}$ of the camera coordinate system to the gravity direction calculation unit 162.

The gravity direction calculation unit 162 calculates the gravity vector 155 on the image (image coordinate system) illustrated in FIG. 8 on the basis of the absolute posture $_{W}R_{C(t=0)}$ of the camera coordinate system from the absolute posture calculation unit 161.

Figure 11:
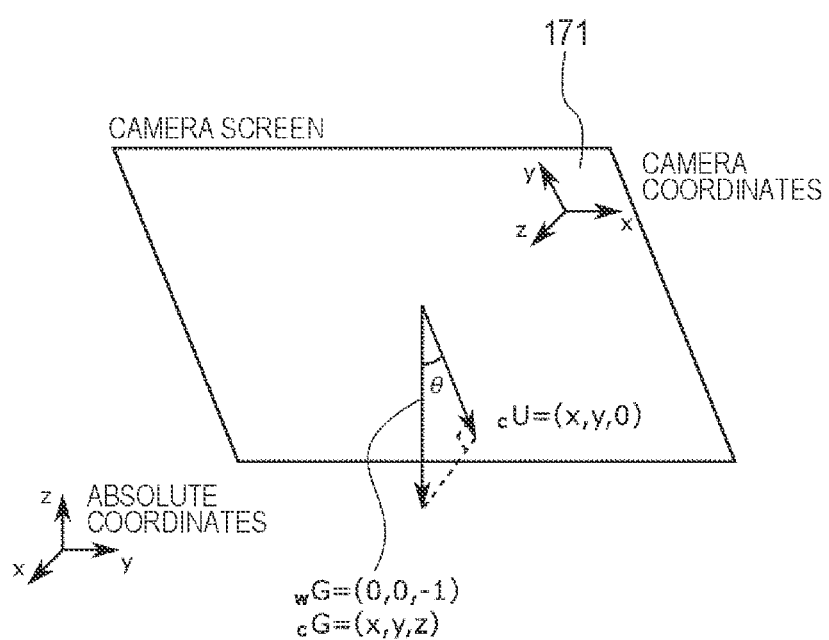
FIG. 11 is a diagram for explaining a calculation procedure of a gravity vector on an image.

FIG. 11 is a diagram for explaining a calculation procedure of the gravity vector 155 on the image. In FIG. 11, a projection surface (camera screen) 171 represents a virtual plane on which an image equivalent to an image captured by the camera 22 is projected in a case where the camera 22 is represented by a perspective projection model. The image coordinate system fixed on the image is fixed to the camera screen 171. Note that the camera screen 171 may be regarded as a light receiving surface of the imaging element of the camera 22.

In this case, the image coordinate system on the camera screen 171 maintains a constant relative posture with respect to the camera coordinate system. The gravity direction calculation unit 162 grasps the relative posture between the camera coordinate system and the image coordinate system.

The gravity direction calculation unit 162 calculates the absolute posture of the image coordinate system from the absolute posture of the camera coordinate system from the absolute posture calculation unit 161 and the relative posture between the camera coordinate system and the image coordinate system.

Furthermore, the gravity direction calculation unit 162 projects a gravity direction vector $_{W}G$ representing the gravity direction in the absolute coordinate system as a unit vector in the normal direction of the camera screen 171 with respect to the camera screen 171. As a result, the gravity direction vector $_{C}U$ in the image coordinate system is obtained.

Here, the gravity direction calculation unit 162 calculates a gravity direction vector $_{C(t=0)}G$ displayed as a component in the camera coordinate system by the following Formula (7) from the absolute posture $_{W}R_{C(t=0)}$ of the camera coordinate system acquired from the absolute posture calculation unit 161 and the gravity direction vector $_{W}G$ displayed as a component in the absolute coordinate system.

$$_{C(t=0)}G = (_{W}R_{C(t=0)})^{T} {_{W}G} \quad (7)$$

As a specific example, when the Z-axis direction of the absolute coordinate system is set to a direction perpendicular to the earth (horizontal plane), the gravity direction vector $_{W}G$ in the absolute coordinate system is displayed as a component by $_{W}G=(0,0,-1)$.

On the other hand, in a case where the gravity direction vector $_{W}G$ is displayed as a component in the camera coordinate system, the gravity direction vector $_{C}G$ is displayed as a component by $_{C}G=(x,y,z)$. x, y, and z are calculated from the absolute posture of the camera coordinate system from the absolute posture calculation unit 161.

On the other hand, the camera coordinate system is set such that a direction perpendicular to the camera screen 171 is a z-axis direction, a horizontal direction of the camera screen 171 (x-axis direction of the image coordinate system) is an x-axis direction, and a vertical direction of the camera screen 171 (y-axis direction of the image coordinate system) is a y-axis direction. In this case, the gravity direction vector $_{C}U$ in the latter camera coordinate system when the gravity direction vector $_{C}G$ is decomposed into the normal direction of the camera screen 171 and the direction perpendicular to the normal direction is displayed as a component by $_{C}U=(x,y,0)$. The gravity direction vector $_{C}U$ represents the gravity vector 155 on the image 153 (image coordinate system) illustrated in FIG. 8.

The gravity direction calculation unit 162 supplies the calculated gravity vector 155 to the base region detection unit 163.

Furthermore, the gravity direction calculation unit 162 calculates an angle θ formed by the gravity direction vector CU and the camera screen 171 (gravity direction vector CW), and supplies the angle θ to the sky determination weight calculation unit 165.

When acquiring the gravity vector 155 from the gravity direction calculation unit 162, the base region detection unit 163 detects a block indicated by the gravity vector 155 among the blocks B00 to B22 (see FIG. 9) of the photometry area 154. Then, the base region detection unit 163 sets the block indicated by the gravity vector 155 or the block and the surrounding blocks as the base region.

In a case where a single block is set as the base region, the base region detection unit 163 sets, as the base integral value, a block integral value obtained by integrating luminance values of pixels included in the block.

Furthermore, in a case where a plurality of blocks is set as the base region, the base region detection unit 163 sets, as the base integral value, a weighted average obtained by weighting the block integral values of those blocks in advance.

Note that the base integral value is used as a reference value representing the luminance value of the ground image.

Figure 12:
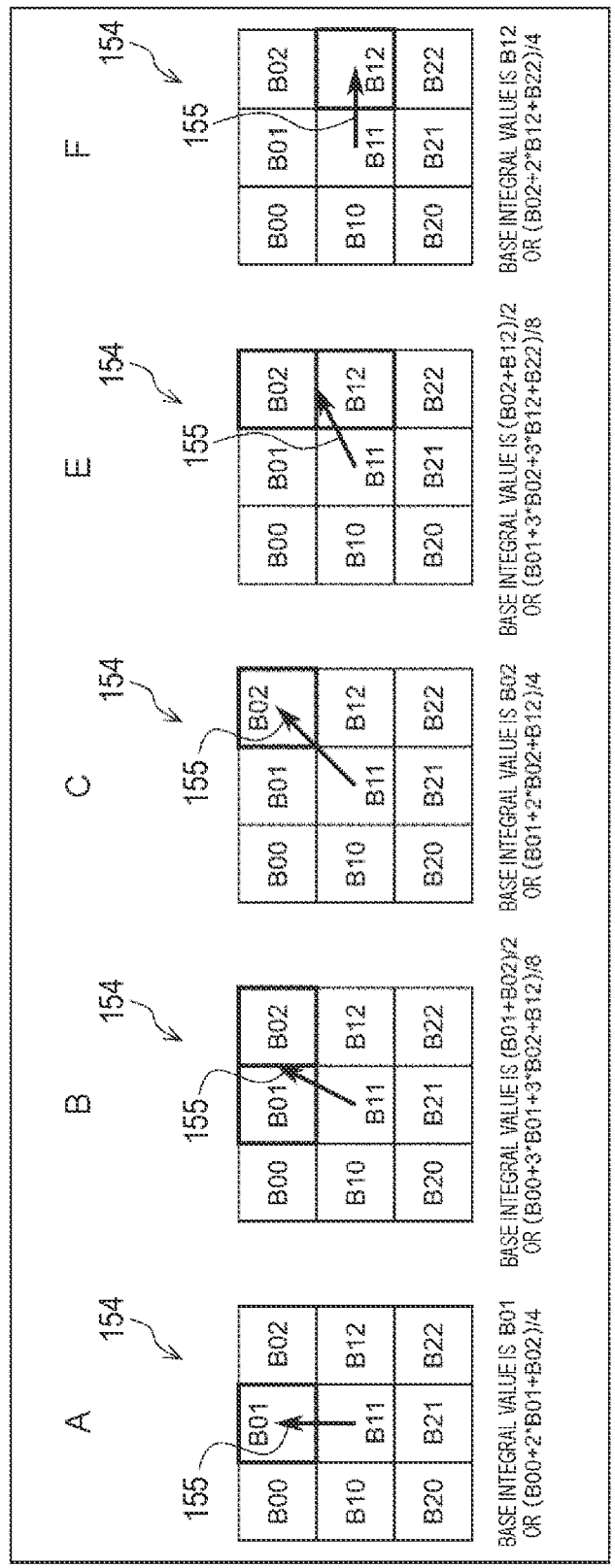
FIG. 12 is a diagram for explaining setting of a base region in a photometry area.

FIG. 12 is a diagram for explaining the setting of the base region in the photometry area 154. Note that, in FIG. 12, an image in which the photometry area 154 is set is omitted.

In FIG. 12, in the pattern A, the end point of the gravity vector 155 is substantially at the center of the block B01, and the gravity vector 155 points substantially at the center of the block B01. As described above, in a case where the gravity vector 155 points to substantially the center of any block other than the central block B11, the base region detection unit 163 sets only the block pointed by the gravity vector 155 as the base region as one pattern. Furthermore, as another pattern, the base region detection unit 163 sets the block pointed by the gravity vector 155 and two blocks (excluding the central block B11) adjacent to the block as the base region.

In the pattern A of FIG. 12, only the block B01 is set as the base region, or the block B01 and the blocks B00 and B02 adjacent to the block B01 are set as the base region.

In a case where only the block B01 is set as the base region, the block integral value of the block 01 is set as the base integral value.

In a case where the block B00, the block B01, and the block B02 are set as the base region, when each block integral value is represented by B00, B01, and B02, a weighted average calculated by (B00+2·B01+B02)/4 is set as the base integrated value.

In the pattern C, which is a pattern similar to the pattern A, the end point of the gravity vector 155 is substantially at the center of the block B02 and points substantially at the center of the block B02. Also in the case of the pattern C, similarly to the case of the pattern A, only the block B02 is set as the base region, or the block B02 and the blocks B01 and B12 adjacent to the block B02 are set as the base region.

In a case where only the block B02 is set as the base region, the block integral value of the block 02 is set as the base integral value.

In a case where the block B01, the block B02, and the block B12 are set as the base region, when each block integral value is represented by B01, B02, and B12, a weighted average calculated by (B01+2·B02+B12)/4 is set as the base integrated value.

In the pattern F, which is a pattern similar to the pattern A, the end point of the gravity vector 155 is substantially at the center of the block B12 and points substantially at the center of the block B12. Also in the case of the pattern F, similarly to the case of the pattern A, only the block B12 is set as the base region, or the block B12 and the blocks B02 and B22 adjacent to the block B12 are set as the base region.

In a case where only the block B12 is set as the base region, the block integral value of the block B12 is set as the base integral value.

In a case where the block B02, the block B12, and the block B22 are set as the base region, when the respective block integral values are represented by B02, B12, and B22, a weighted average calculated by (B02+2·B11+B22)/4 is set as the base integrated value.

The case where the end point of the gravity vector 155 is substantially at the center of the block B00, substantially at the center of the block B10, substantially at the center of the block B20, substantially at the center of the block B21, or substantially at the center of the block B22 is similar to the case of the pattern A, the pattern C, and the pattern F, and thus description thereof is omitted.

In the pattern B, the end point of the gravity vector 155 is near the boundary between the block B01 and the block B02, and the gravity vector 155 points near the boundary between the block B01 and the block B02. As described above, in a case where the gravity vector 155 points near the boundary of two blocks adjacent to each other excluding the central block B11, the base region detection unit 163 sets two blocks adjacent to each other as the base region as one pattern. As another pattern, the base region detection unit 163 sets two blocks adjacent to each other and two other blocks adjacent to each of the two blocks as the base region.

In the pattern B, the block B01 and the block B02 are set as the base region, or the block B01 and the block B02 and the blocks B00 and B12 adjacent thereto are set as the base region.

In a case where the block B01 and the block B02 are set as the base region, when the respective block integral values are represented by B01 and B02, a weighted average calculated by (B01+B02)/2 is set as the base integrated value.

In a case where the block B00, the block B01, the block B02, and the block B12 are set as the base region, when each block integral value is represented by B00, B01, B02, and B12, a weighted average calculated by (B00+3·B01+3·B02+B12)/8 is set as the base integrated value.

In the pattern E, which is a pattern similar to the pattern B, the end point of the gravity vector 155 is near the boundary between the block B02 and the block B12, and the gravity vector 155 points near the boundary between the block B02 and the block B12. Also in the case of the pattern E, similarly to the case of the pattern B, the block B02 and the block B12 are set as the base region, or the block B02 and the block B12 and the blocks B01 and B22 adjacent thereto are set as the base region.

In a case where the block B02 and the block B12 are set as the base region, when the respective block integral values are represented by B02 and B12, a weighted average calculated by (B02+B12)/2 is set as the base integrated value.

In a case where the block B01, the block B02, the block B12, and the block B22 are set as the base region, when the respective block integral values are represented by B01, B02, B12, and B22, a weighted average calculated by (B01+3·B02+3·B12+B22)/8 is set as the base integrated value.

As a pattern similar to the pattern B and the pattern E, there are a case where the end point of the gravity vector 155 is near the boundary between the block B12 and the block B22, a case where the end point is near the boundary between the block B21 and the block B22, a case where the end point is near the boundary between the block B20 and the block B21, a case where the end point is near the boundary between the block B10 and the block B20, a case where the end point is near the boundary between the block B00 and the block B10, and a case where the end point is near the boundary between the block B00 and the block B01. These cases are similar to the cases of the pattern B and the pattern E, and thus the description thereof is omitted.

In FIG. 10, the base region detection unit 163 supplies the calculated base integral value to the luminance determination weight calculation unit 164.

The luminance determination weight calculation unit 164 acquires the base integral value from the base region detection unit 163.

Furthermore, the luminance determination weight calculation unit 164 acquires block integral values of the blocks B00 to B22 (see FIG. 9) of the photometry area 154 from the block integration unit 141 in FIG. 5.

Meanwhile, when calculating the weighted sum of the block integral values of the blocks B00 to B22 in the photometry area 154, the weight calculation unit 142 calculates a weight (weight coefficient) $W_i$ to be multiplied by each block integral value. i is an identification number associated with each of the blocks B00 to B22 on a one-to-one basis.

The luminance determination weight calculation unit 164 calculates a luminance determination weight $w_i$, which is a factor for deciding the weight $W_i$, by the following Formula (8).

$$w_i = \exp(-\max(\text{sum}_i - \text{sum}_{base}, 0)^2/\sigma) \quad (8)$$

Here, $\text{sum}_i$ represents a block integral value of the identification number i, $\text{sum}_{base}$ represents a base integral value, and σ represents an adjustment parameter.

According to Formula (8), the larger the block integral value is with respect to the base integral value, the smaller the luminance determination weight $w_i$ is, so that the contribution ratio to the exposure control becomes lower. For example, the influence on exposure control of bright image regions such as sky or the like is reduced. Furthermore, since the luminance determination weight $w_i$ is less likely to decrease as a increases, the image tends to be brighter as a whole.

The luminance determination weight calculation unit 164 supplies the calculated luminance determination weight $w_i$ for each of the blocks B00 to B22 to the sky determination weight calculation unit 165.

The sky determination weight calculation unit 165 calculates the certainty (or likelihood) that a sky image is included in the image 153 (see FIG. 6) captured by the camera 22 as a factor for deciding the weight $W_i$.

In a case where the luminance histogram is obtained along the axis of the gravity vector 155 on the image 153, the sky determination weight calculation unit 165 detects whether or not the ground image region and the sky image region are polarized.

In the present embodiment, the sky determination weight calculation unit 165 simply calculates the bipolar determination value Da indicating a large value in a case where the image 153 is polarized between the ground image region and the sky image region by the following Formula (9).

$$Da=C/(C+w_{diag}) \quad (9)$$

where $w_{diag}$ is a luminance determination weight $w_i$ of a block (diagonal block) positioned diagonally to the block of the photometry area 154 set as the base region by the base region detection unit 163. C is an arbitrary constant for adjustment.

Note that the diagonal block is also a block at a position symmetrical with respect to the block of the base region with the center of the photometry area 154 (image) as a symmetrical point.

According to Formula (9), the smaller the luminance determination weight $w_{diag}$ of the diagonal block with respect to the block of the base region, the larger the difference from the base integral value serving as a reference of the luminance value of the ground image region, and thus, there is a high possibility that the polarization occurs.

Therefore, the bipolar determination value Da may be a certainty that a sky image region is included in the image 153.

Note that, in a case where there is a plurality of blocks in the base region, the bipolar determination value Da is calculated with the weighted average of the luminance determination weights $w_i$ of the diagonal blocks for each block as $w_{diag}$. The weight at this time may be the same as the weight for each block when the base integral value is calculated. Furthermore, even in a case where there is a single diagonal block with respect to the block of the base region, blocks around the diagonal block may be set as diagonal blocks.

Furthermore, the sky determination weight calculation unit 165 calculates the luminance determination value Db by the following Formula (10) from the block integral value of the diagonal block with respect to the block of the base region.

$$Db=\exp(-\max(sum_{ref}-sum_{diag},0)^2/\sigma') \quad (10)$$

where $sum_{ref}$ is the luminance value (threshold) that determines whether or not it is sky, $sum_{diag}$ is the block integral value of the diagonal block with respect to the block of the base region, and $\sigma'$ is an arbitrary constant for adjustment.

According to Formula (10), when the block integral value of the diagonal block is larger than a luminance value (threshold) that can be determined to be sky, there is a high possibility that a sky image region is included in the image 153. Therefore, the luminance determination value Db can be a certainty that a sky image region is included in the image 153.

Furthermore, the sky determination weight calculation unit 165 acquires an angle θ formed by the gravity direction vector $_cU$ calculated by the gravity direction calculation unit 162 and the camera screen 171 (gravity direction vector $_cW$), and calculates a horizontal determination value Dc for determining whether or not the imaging direction of the camera 22 is close to the horizontal direction by the following Formula (11).

$$Dc=\cos\theta \quad (11)$$

According to Formula (11), the closer the imaging direction of the camera 22 is to the horizontal direction, the higher the possibility that a sky image region is included in the image 153, and the horizontal determination value Dc increases. Therefore, the horizontal determination value Dc can be a certainty that a sky image region is included in the image 153.

The sky determination weight calculation unit 165 multiplies the bipolar determination value Da, the luminance determination value Db, and the horizontal determination value Dc to calculate the sky determination weight $w_{sky}$ as the certainty that the image 153 includes the sky image region by the following Formula (12).

$$w_{sky}=Da \cdot Db \cdot Dc \quad (12)$$

Then, when finally calculating the weighted sum of the block integral values of the blocks B00 to B22 in the photometry area 154, the sky determination weight calculation unit 165 calculates a weight (weight coefficient) $W_i$ to be multiplied by each block integral value by the following Formula (13).

$$W_i=w_{sky} \cdot w_i+(1-w_{sky}) \cdot 1 \quad (13)$$

According to Formula (13), as the sky determination weight $w_{sky}$ is larger, the luminance determination weight $w_i$ calculated on the basis of the base integral value and the block integral value by Formula (8) is reflected in the final value of the weight $W_i$.

On the other hand, the smaller the sky determination weight $w_{sky}$, the smaller the difference in the weight $W_i$ for each of the blocks B00 to B22.

Therefore, it is automatically determined whether or not a sky image region is included in the image captured by the camera 22. Then, in a case where a sky image region is included, exposure control in which the influence of the sky image region is reduced is performed, and appropriate exposure control for the ground image region is performed. In a case where a sky image region is not included, exposure control is performed as usual. As a result, the feature points on the ground are appropriately detected from the image captured by the camera 22, and the position/posture of the mobile body are appropriately estimated.

Figure 13:
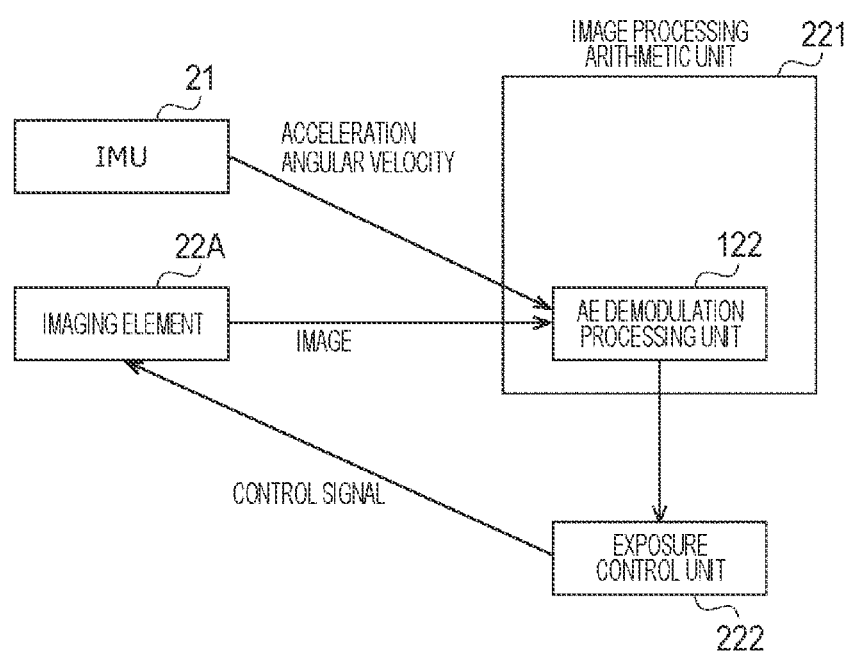
FIG. 13 is a block diagram illustrating a flow of transmission information of an exposure processing unit.

FIG. 13 is a block diagram illustrating a flow of transmission information of the exposure processing unit 23.

The exposure processing unit 23 in FIG. 13 includes an AE demodulation processing unit 122 and an exposure control unit 222.

The AE demodulation processing unit 122 is the AE demodulation processing unit 122 illustrated in FIG. 5, and is constructed by executing a program in the image processing arithmetic unit 221.

However, FIG. 13 is different from the case of FIG. 5 in that an image captured by the imaging element 22A of the camera 22 is supplied to the AE demodulation processing unit 122 without passing through the exposure processing unit 23 of FIG. 5.

Furthermore, the acceleration and the acceleration detected by the IMU 21 are supplied to the AE demodulation processing unit 122. In FIG. 5, the relative posture of the IMU coordinate system calculated by the INS processing unit 41 is supplied to the AE demodulation processing unit 122, but the AE demodulation processing unit 122 may perform processing of calculating the relative posture of the IMU coordinate system on the basis of the acceleration and the angular velocity from the IMU 21.

The AE demodulation processing unit 122 detects the gravity direction (gravity vector 155) on the image on the basis of the acceleration and the angular velocity from the IMU 22, and determines a sky image region and a ground image region included in the image from the imaging element 22A.

Then, the AE demodulation processing unit 122 calculates the weighted sum of the block integral values by reducing the weight with respect to the block integral value of the block set in the sky image region among the blocks B00 to B22 of the photometry area 154.

The AE demodulation processing unit 122 calculates an appropriate exposure value on the basis of the weighted sum of the calculated block integral values, and supplies the exposure value to the exposure control unit 222.

Unlike the case of FIG. 5, the exposure control unit 222 performs exposure control by controlling a shutter speed (exposure time), an analog gain, a digital gain, and the like of the imaging element 22A according to a control signal to the imaging element 22A without acquiring an image from the camera 22. Note that, in a case where the camera 22 includes a diaphragm, the diaphragm may be controlled.

The exposure control unit 222 controls exposure of the imaging element 22A or the like according to the exposure value from the AE demodulation processing unit 122.

(Processing Procedure of Exposure Processing Unit 23)

Figure 14:
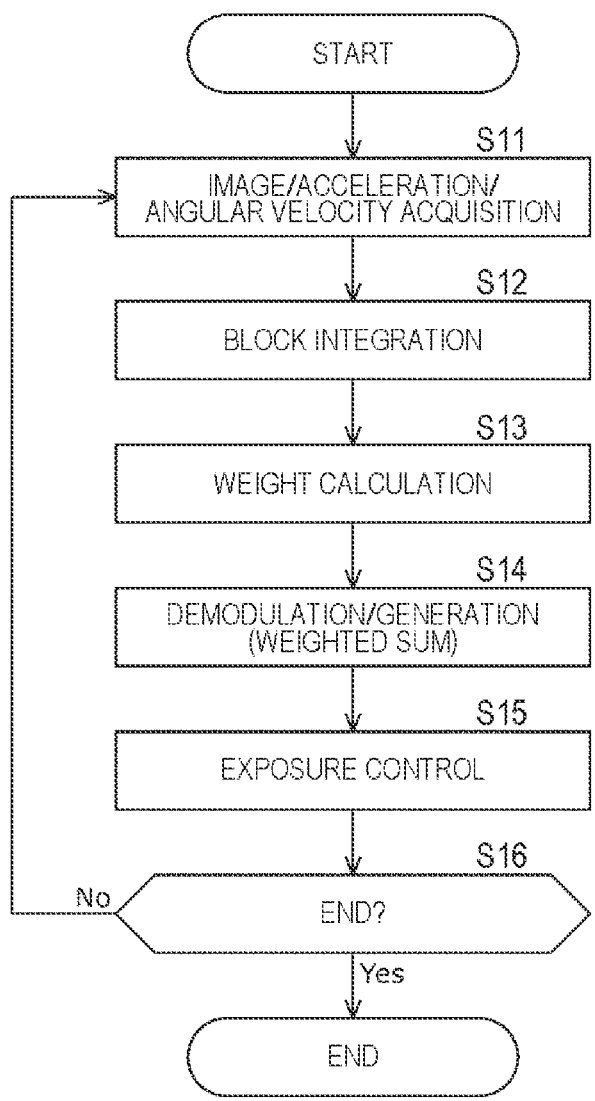
FIG. 14 is a flowchart illustrating a procedure of processing performed by an exposure processing unit.

FIG. 14 is a flowchart illustrating a procedure of processing performed by the exposure processing unit 23.

In FIG. 14, in step S11, the exposure processing unit 23 acquires an image from the camera 22, and acquires acceleration and angular velocity from the IMU 21. The process proceeds from step S11 to step S12. Note that the exposure processing unit 23 may acquire the relative posture of the IMU coordinate system from the INS processing unit 41 instead of acquiring the acceleration and the angular velocity from the IMU 21 as in the case of FIG. 13.

In step S12, the exposure processing unit 23 calculates block integral values of the blocks B00 to B22 in the photometry area 154. The process proceeds from step S12 to step S13.

In step S13, the exposure processing unit 23 calculates a weight to be multiplied by the block integral value calculated in step S12. The process proceeds from step S13 to step S14.

In step S14, the exposure processing unit 23 calculates a weighted sum from the block integral value calculated in step S12 and the weight calculated in step S13, and generates the calculated weighted sum as a demodulation signal representing the brightness of the photometry area 154. The process proceeds from step S14 to step S15.

In step S15, the exposure processing unit 23 also performs exposure control following the demodulation signal generated in step S15. The process proceeds from step S15 to step S16.

In step S16, the exposure processing unit 23 determines whether or not an end instruction has been given.

In a case where it is determined in step S16 that an end instruction is not given, the process returns from step S16 to step S11, and the process from step S11 is repeated.

In a case where it is determined in step S16 that an end instruction has been given, the process of this flowchart ends.

According to the processing of the exposure processing unit 23 described above, the brightness of the ground image region contributes more strongly to the exposure control of the camera 22 than the sky image region. Therefore, it is possible to suppress a situation in which the contrast of the ground image is low and the feature points cannot be detected.

Note that, in the embodiment described above, the IMU 21 (inertial sensor) is used to detect the gravity direction, but a device capable of detecting and observing the gravity direction may be used instead of the IMU 21.

Furthermore, in the embodiment described above, the sky determination weight $W_{sky}$ is calculated by the bipolar determination value Da, the luminance determination value Db, and the horizontal determination value Dc as the certainty that the image 153 includes the sky image region in the sky determination weight calculation unit 165 (FIG. 11), but the sky determination weight $w_{sky}$ may be obtained by any one or more of these. An arbitrary type and an arbitrary number of determination values may be used to calculate the sky determination weight $W_{sky}$ including the depth determination value Dd and the sky label determination value De described in the following embodiments. Furthermore, only the luminance determination weight $w_i$ may be used without using the sky determination weight $w_{sky}$.

<Description of Second Embodiment of Exposure Processing Unit>

Figure 15:
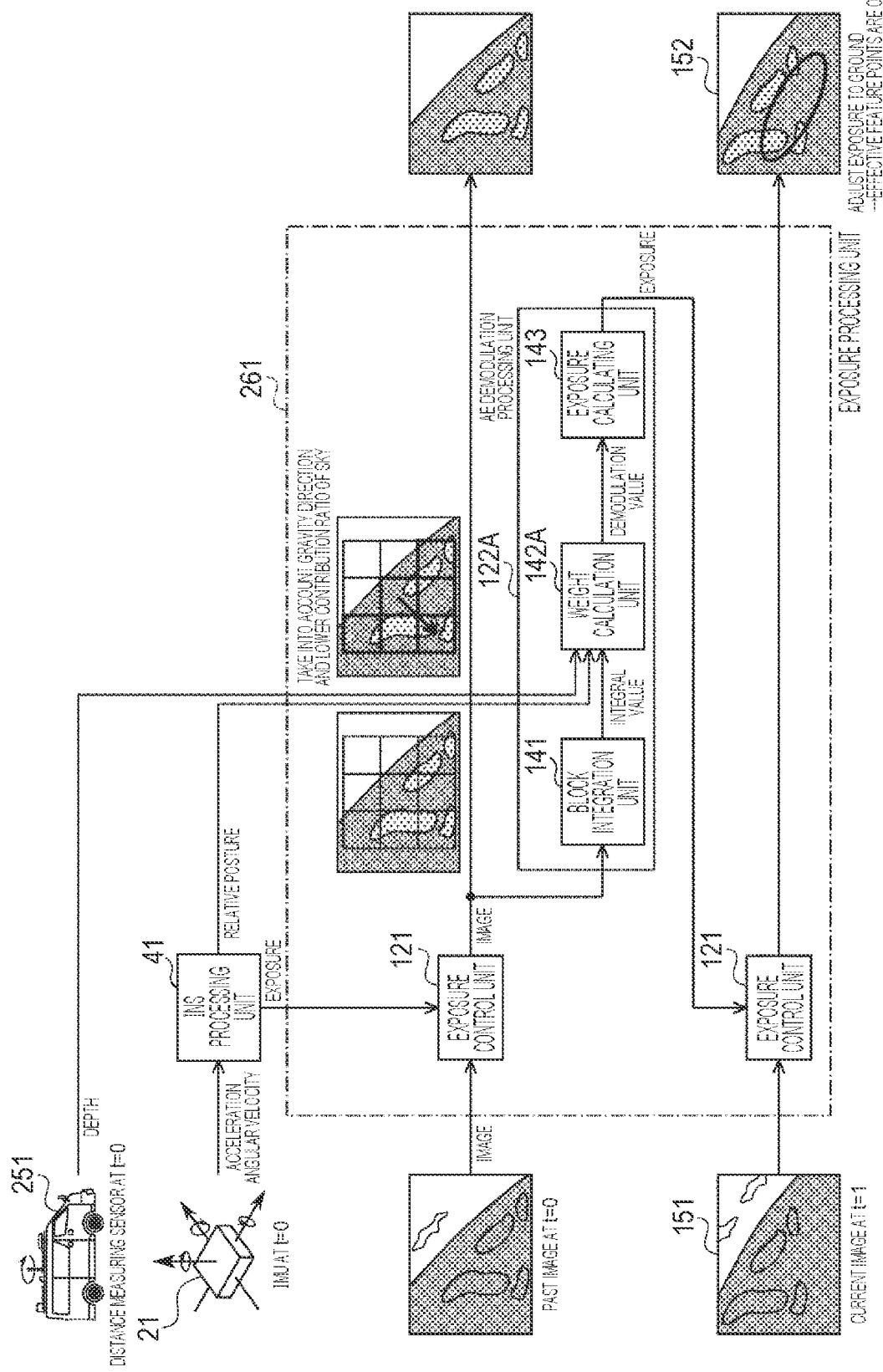
FIG. 15 is a block diagram illustrating a configuration of a second embodiment of an exposure processing unit.

FIG. 15 is a block diagram illustrating a configuration of a second embodiment of the exposure processing unit.

Note that, in the drawing, portions corresponding to those of the exposure processing unit 23 in FIG. 5 are denoted by the same reference numerals, and the description thereof will be omitted.

The exposure processing unit 261 in FIG. 15 includes an exposure control unit 121 and an AE demodulation processing unit 122A. Furthermore, the AE demodulation processing unit 122A in FIG. 15 includes a block integration unit 141, a weight calculation unit 142A, and an exposure calculating unit 143.

Therefore, the exposure processing unit 261 in FIG. 15 is common to the case in FIG. 5 in including the exposure control unit 121, the AE demodulation processing unit 122A, the block integration unit 141, the weight calculation unit 142A, and the exposure calculating unit 143. However, the exposure processing unit 261 in FIG. 15 is different from the case in FIG. 5 in that the weight calculation unit 142A acquires depth information from a distance measuring sensor 251.

The distance measuring sensor 251 is, for example, a sensor capable of acquiring depth information of a subject such as light detection and ranging (LIDAR) or a stereo camera.

The depth information obtained by the distance measuring sensor 251 is supplied to the weight calculation unit 142A of the AE demodulation processing unit 122A.

Figure 16:
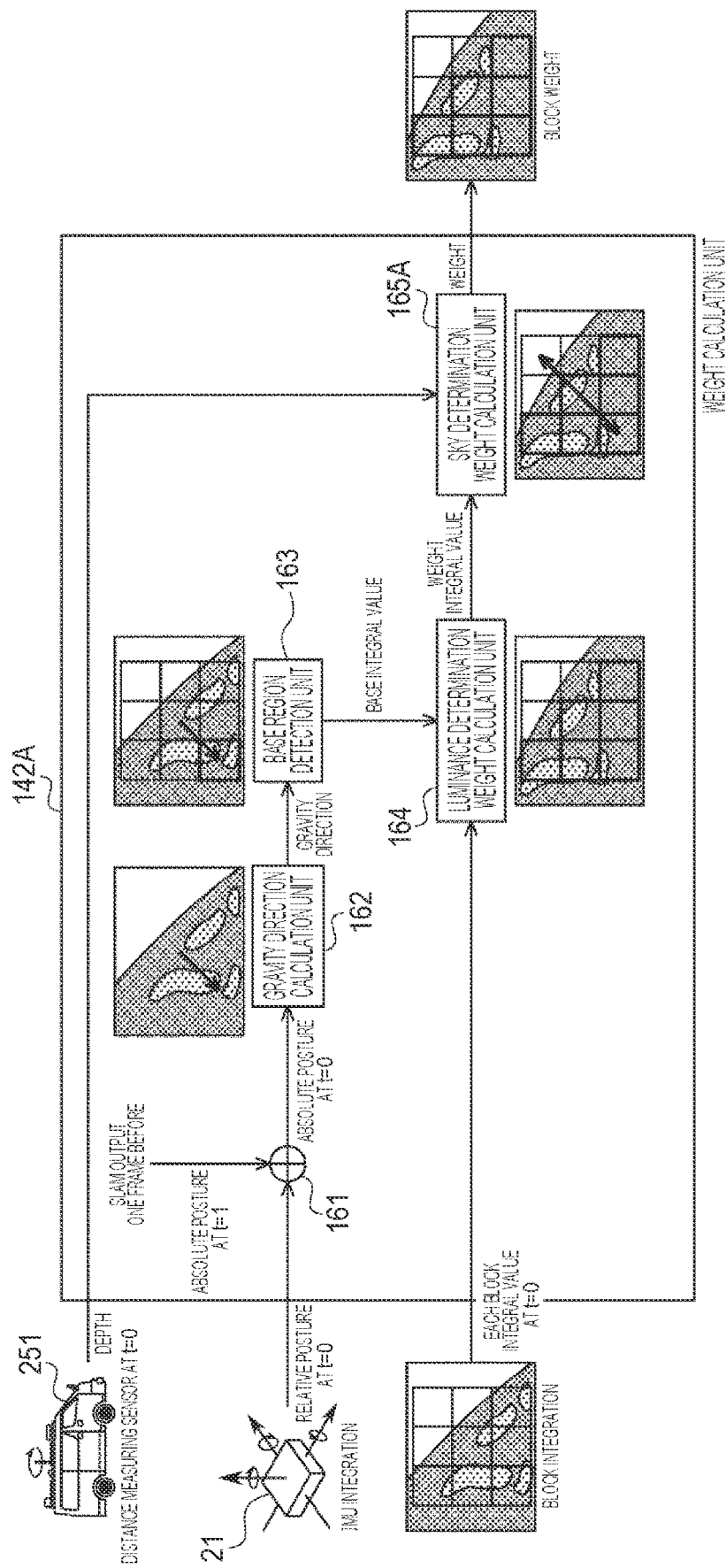
FIG. 16 is a block diagram illustrating a configuration of a weight calculation unit.

FIG. 16 is a block diagram illustrating a configuration of the weight calculation unit 142A in FIG. 15.

Note that, in the drawing, portions corresponding to those of the weight calculation unit 142 in FIG. 10 are denoted by the same reference numerals, and the description thereof will be omitted.

The weight calculation unit 142A in FIG. 16 includes an absolute posture calculation unit 161, a gravity direction calculation unit 162, a base region detection unit 163, a luminance determination weight calculation unit 164, and a sky determination weight calculation unit 165A.

Therefore, the weight calculation unit 142A in FIG. 16 is common to the case in FIG. 10 in including the absolute posture calculation unit 161, the gravity direction calculation unit 162, the base region detection unit 163, the luminance determination weight calculation unit 164, and the sky determination weight calculation unit 165A. However, the weight calculation unit 142A of FIG. 16 is different from the case of FIG. 10 in that the sky determination weight calculation unit 165A acquires depth information from the distance measuring sensor 251.

Similarly to the sky determination weight calculation unit 165 in FIG. 10, the sky determination weight calculation unit 165A calculates a bipolar determination value Da (see Formula (9)), a luminance determination value Db (see Formula (10)), and a horizontal determination value Dc (see Formula (11)).

Furthermore, the sky determination weight calculation unit 165A acquires depth information from the distance measuring sensor 251. Then, the sky determination weight calculation unit 165A calculates a depth determination value Dd indicating a large value in a case where the image of the diagonal block with respect to the block of the base region of the photometry area 154 is sky by the following Formula (14).

$$Dd = \exp(-\max(dsum_{ref} - dsum_{diag}, 0)^2 / \sigma'') \quad (14)$$

where $dsum_{ref}$ is the depth value (threshold) that determines whether or not it is sky, $dsum_{diag}$ is the depth integral value in the diagonal block with respect to the block of the base region, and $\sigma''$ is an arbitrary constant for adjustment.

According to Formula (14), in a case where the depth integral value $dsum_{diag}$ of the diagonal block is larger than the threshold $dsum_{ref}$, there is a high possibility that the image of the diagonal block is sky, and the depth determination value Dd also increases. Therefore, the depth determination value Dd may be a certainty that a sky image region is included in the image 153.

Note that, in a case where there is a plurality of blocks of the base region, the depth determination value Dd is calculated using a weighted average of the depth integral values of the diagonal blocks for each block as the depth integral value $dsum_{diag}$. The weight at this time may be the same as the weight for each block when the base integral value is calculated. Furthermore, even in a case where there is a single diagonal block with respect to the block of the base region, blocks around the diagonal block may be set as diagonal blocks. In this case, the weighted average of the depth integral values of the diagonal blocks is set as a depth integral value $dsum_{diag}$.

The sky determination weight calculation unit 165A multiplies the bipolar determination value Da, the luminance determination value Db, the horizontal determination value Dc, and the depth determination value Dd to calculate a sky determination weight $w_{sky}$ as the certainty that the image 153 includes a sky image region by the following Formula (15).

$$w_{sky} = Da \cdot Db \cdot Dc \cdot Dd \quad (15)$$

Then, when finally calculating the weighted sum of the block integral values of the blocks B00 to B22 in the photometry area 154, the sky determination weight calculation unit 165A calculates a weight (weight coefficient) $W_1$ to be multiplied by each block integral value by the above Formula (13).

$$W_i = w_{sky} \cdot w_i + (1 - w_{sky}) \cdot 1 \quad (13)$$

According to the sky determination weight calculation unit 165A in the second embodiment of the exposure processing unit 261, the certainty of determination as to whether or not the image captured by the camera 22 includes a sky image is improved. Therefore, the exposure control is appropriately performed.

Figure 17:
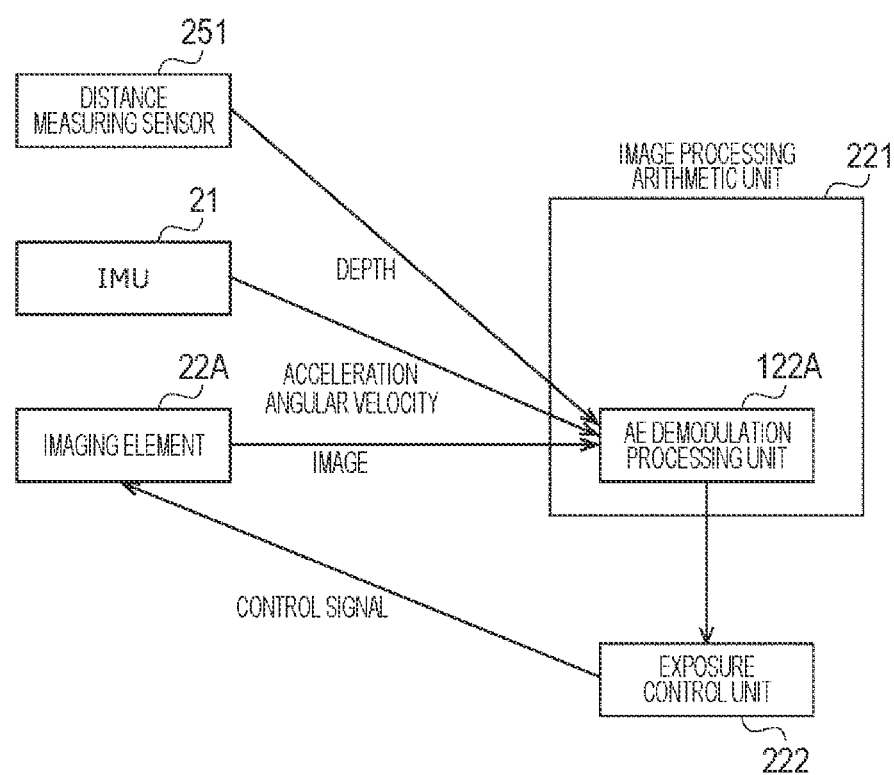
FIG. 17 is a block diagram illustrating a flow of transmission information of the exposure processing unit in FIG. 15.

FIG. 17 is a block diagram illustrating a flow of transmission information of the exposure processing unit 261 in FIG. 15.

Note that, in the figure, portions corresponding to those of the exposure processing unit 23 in FIG. 13 are denoted by the same reference numerals, and description thereof is omitted.

The exposure processing unit 261 in FIG. 17 includes an AE demodulation processing unit 122A and an exposure control unit 222.

Therefore, the exposure processing unit 261 in FIG. 17 is common to the case in FIG. 13 in including the AE demodulation processing unit 122A and the exposure control unit 222. However, the exposure processing unit 261 in FIG. 17 is different from the case in FIG. 13 in that the AE demodulation processing unit 122A acquires depth information from the distance measuring sensor 251.

The AE demodulation processing unit 122A acquires an image from the imaging element 22A, and acquires acceleration and angular velocity from the IMU 21. Based on these pieces of information, the AE demodulation processing unit 122A calculates the luminance determination weight $w_i$ for calculating the weighted sum of the block integral values of the blocks B00 to B22 in the photometry area, and calculates the bipolar determination value Da, the luminance determination value Db, and the horizontal determination value Dc for calculating the sky determination weight $w_{sky}$, similarly to the case of FIG. 13.

Furthermore, the AE demodulation processing unit 122A calculates the depth determination value Dd by acquiring the depth information from the distance measuring sensor 251. The AE demodulation processing unit 122A sets the depth determination value Dd as one factor for calculating the sky determination weight $w_{sky}$. As a result, the certainty of the sky determination weight $W_{sky}$ is improved.

(Processing Procedure of Exposure Processing Unit 261)

Figure 18:
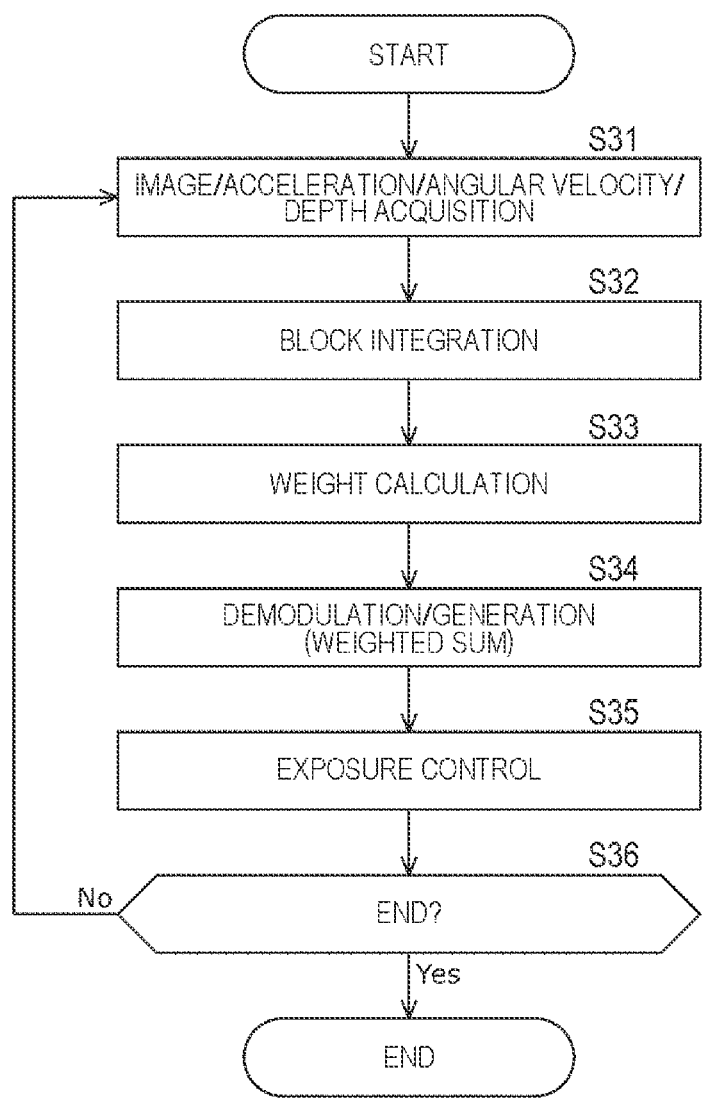
FIG. 18 is a flowchart illustrating a procedure of processing performed by the exposure processing unit in FIG. 15.

FIG. 18 is a flowchart illustrating a procedure of processing performed by the exposure processing unit 261 in FIGS. 15 and 17.

In FIG. 14, in step S31, the exposure processing unit 261 acquires an image from the camera 22, and acquires acceleration and angular velocity from the IMU 21. Furthermore, the exposure processing unit 261 acquires depth information from the distance measuring sensor 251. The process proceeds from step S31 to step S32.

The processing of steps S32 to S36 differs from the processing of steps S12 to S16 of FIG. 14 in detailed processing contents such as weight calculation contents and the like, but rough processing procedures are common, and thus description thereof is omitted.

According to the processing of the exposure processing unit 261 described above, the brightness of the ground image region contributes more strongly to the exposure control of the camera 22 than the sky image region. Therefore, it is possible to suppress a situation in which the contrast of the ground image is low and the feature points cannot be detected.

<Description of Third Embodiment of Exposure Processing Unit>

Figure 19:
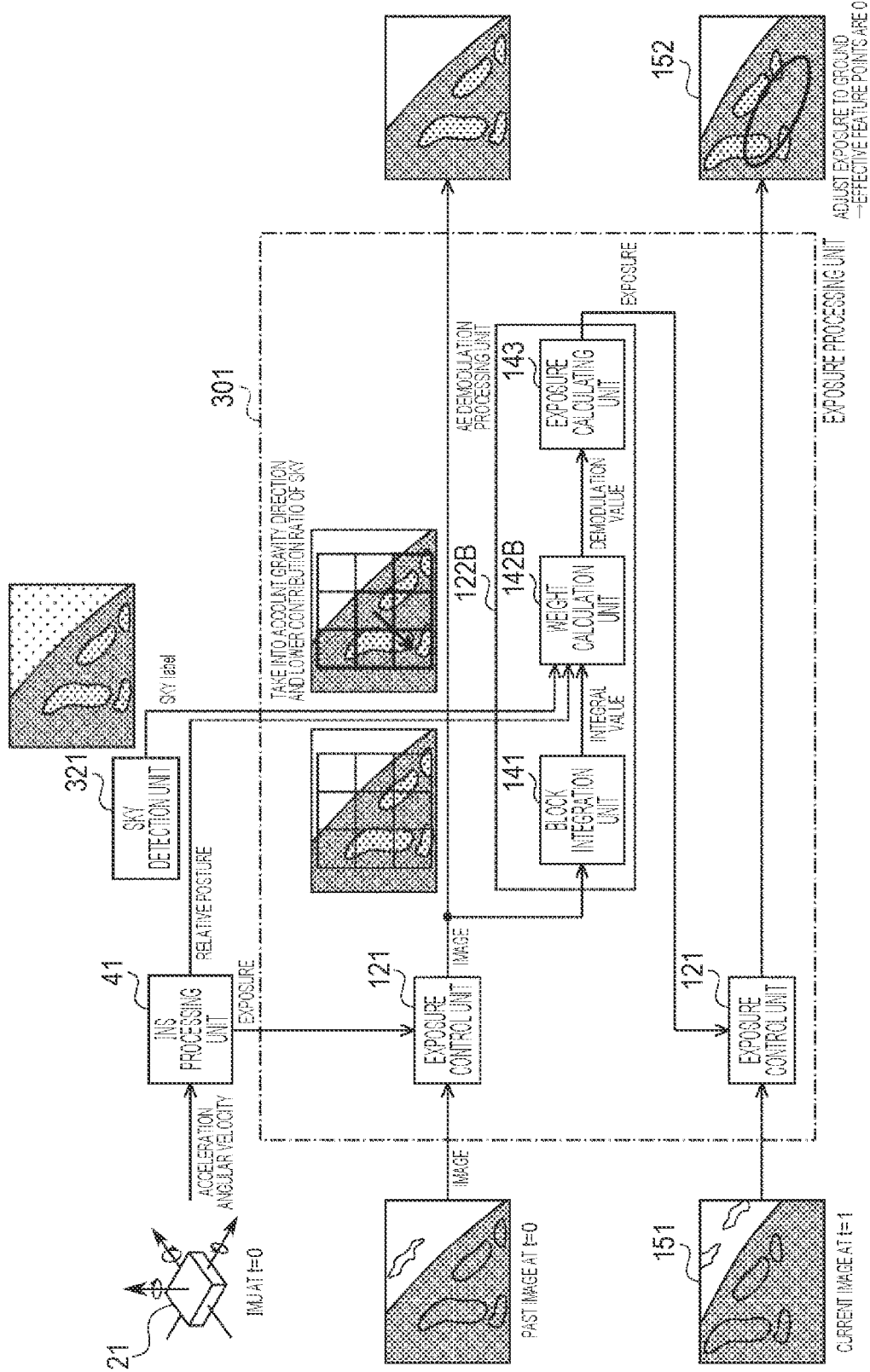
FIG. 19 is a block diagram illustrating a configuration of a third embodiment of an exposure processing unit.

FIG. 19 is a block diagram illustrating a configuration of a third embodiment of the exposure processing unit.

Note that, in the drawing, portions corresponding to those of the exposure processing unit 23 in FIG. 5 are denoted by the same reference numerals, and the description thereof will be omitted.

The exposure processing unit 301 in FIG. 19 includes an exposure control unit 121 and an AE demodulation processing unit 122B. Furthermore, the AE demodulation processing unit 122B in FIG. 19 includes a block integration unit 141, a weight calculation unit 142B, and an exposure calculating unit 143.

Therefore, the exposure processing unit 301 in FIG. 19 is common to the case in FIG. 5 in including the exposure control unit 121, the AE demodulation processing unit 122B, the block integration unit 141, the weight calculation unit 142B, and the exposure calculating unit 143. However, the exposure processing unit 301 in FIG. 19 is different from the case in FIG. 5 in that the weight calculation unit 142B acquires a sky label from a sky detection unit 321.

The sky detection unit 321 detects a sky image region from an image captured by the camera 22 by a machine learning model using a deep neural network (DNN). Furthermore, a DNN (for example, Alex Kendall, Vijay Badrinarayanan, Roberto Cipolla (2017) "Bayesian SegNet: Model Uncertainty in Deep Convolutional Encoder-Decoder Architectures for Scene Understanding", BMVC) that outputs the reliability probability together with a sky label for a sky image region is used for the sky detection unit 321.

The weight calculation unit 142B calculates a sky determination weight $w_{sky}$ on the basis of the sky label and the reliability probability from the sky detection unit 321.

Figure 20:
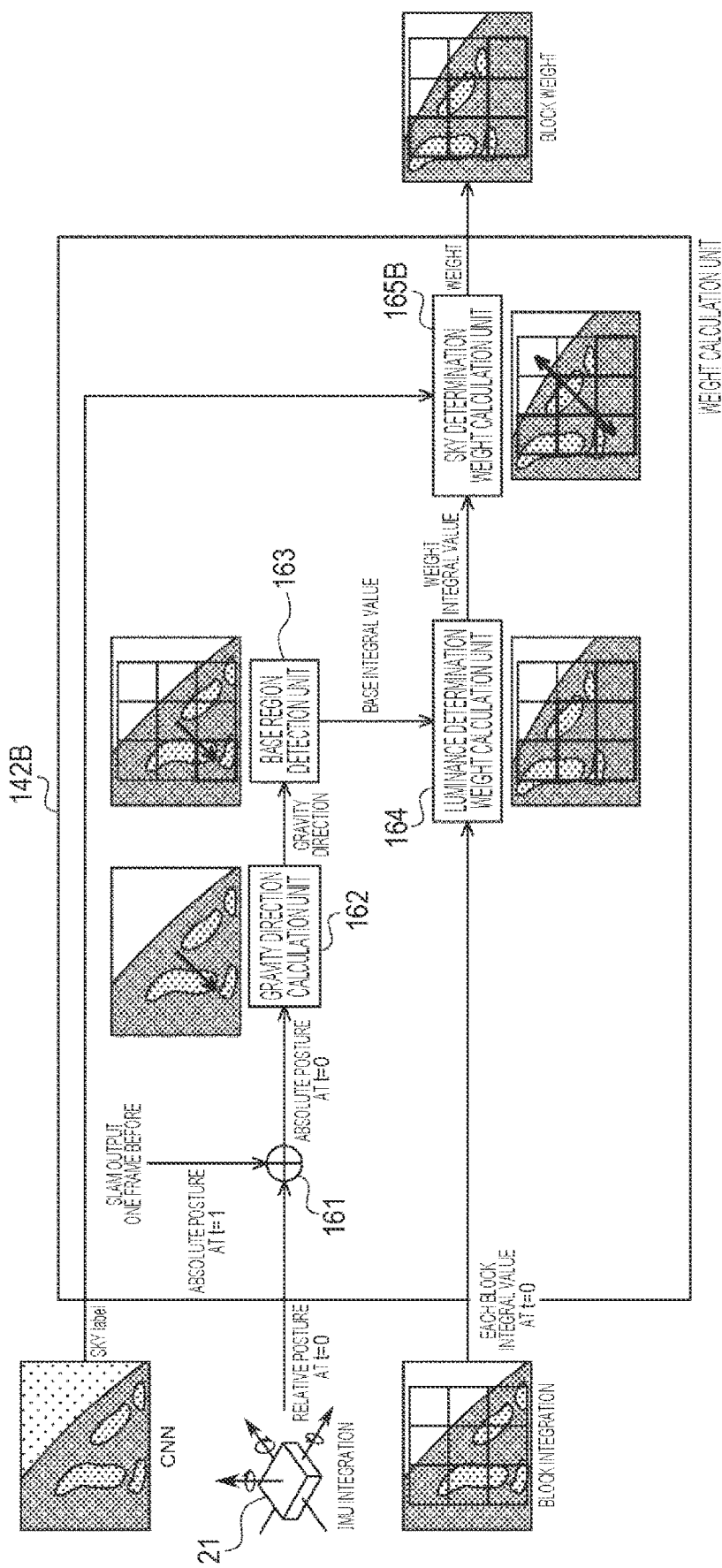
FIG. 20 is a block diagram illustrating a configuration of a weight calculation unit in FIG. 19.

FIG. 20 is a block diagram illustrating a configuration of the weight calculation unit 142B in FIG. 19.

Note that, in the drawing, portions corresponding to those of the weight calculation unit 142 in FIG. 10 are denoted by the same reference numerals, and the description thereof will be omitted.

The weight calculation unit 142B in FIG. 20 includes an absolute posture calculation unit 161, a gravity direction calculation unit 162, a base region detection unit 163, a luminance determination weight calculation unit 164, and a sky determination weight calculation unit 165B.

Therefore, the weight calculation unit 142B in FIG. 20 is common to the case in FIG. 10 in including the absolute posture calculation unit 161, the gravity direction calculation unit 162, the base region detection unit 163, the luminance determination weight calculation unit 164, and the sky determination weight calculation unit 165B. However, the weight calculation unit 142B of FIG. 20 is different from the case of FIG. 10 in that the sky determination weight calculation unit 165B acquires the sky label and the reliability probability from the sky detection unit 321.

Similarly to the sky determination weight calculation unit 165 in FIG. 10, the sky determination weight calculation unit 165B calculates a bipolar determination value Da (see Formula (9)), a luminance determination value Db (see Formula (10)), and a horizontal determination value Dc (see Formula (11)).

Furthermore, the sky determination weight calculation unit 165B acquires a sky label representing a sky region included in the image captured by the camera 22 and its reliability probability from the sky detection unit 321 (see FIG. 19). The sky determination weight calculation unit 165B calculates a sky label determination value De indicating a large value in a case where the image of the diagonal block with respect to the block of the base region of the photometry area 154 is sky by the following Formula (16).

$$De = \exp(-\max(Isum_{ref} - Isum_{diag}, 0)^2 / \sigma''') \quad (16)$$

where $Isum_{ref}$ is the reliability probability (threshold) that determines whether or not it is sky, $Isum_{diag}$ is the reliability probability integral value of the sky label in the diagonal block with respect to the block of the base region, and $\sigma'''$ is an arbitrary constant for adjustment.

According to Formula (16), in a case where the reliability probability integral value $Isum_{diag}$ of the diagonal block is larger than the threshold $Isum_{ref}$, there is a high possibility that the image of the diagonal block is sky, and the sky label determination value De also becomes a large value. Therefore, the sky label determination value De can be a certainty that a sky image region is included in the image 153.

Note that, in a case where there is a plurality of blocks in the base region, the sky label determination value De is calculated using a weighted average of the reliability probability integral values of the diagonal blocks for each block as the reliability probability integral value $Isum_{diag}$. The weight at this time may be the same as the weight for each block when the base integral value is calculated. Furthermore, even in a case where there is a single diagonal block with respect to the block of the base region, blocks around the diagonal block may be set as diagonal blocks. In this case, a weighted average of the reliability probability integral values of the diagonal blocks is set as a reliability probability integral value $Isum_{diag}$.

The sky determination weight calculation unit 165B multiplies the bipolar determination value Da, the luminance determination value Db, the horizontal determination value Dc, and the sky label determination value De to calculate a sky determination weight $w_{sky}$ as the certainty that the image 153 includes a sky image region by the following Formula (17).

$$w_{sky} = Da \cdot Db \cdot Dc \cdot De \quad (17)$$

Then, when finally calculating the weighted sum of the block integral values of the blocks B00 to B22 in the photometry area 154, the sky determination weight calculation unit 165B calculates a weight (weight coefficient) $W_i$ to be multiplied by each block integral value by the above Formula (13).

$$W_i = w_{sky} \cdot w_i + (1 - w_{sky}) \cdot 1 \quad (13)$$

According to the sky determination weight calculation unit 165A in the second embodiment of the exposure processing unit 261, the certainty of determination as to whether or not the image captured by the camera 22 includes a sky image is improved. Therefore, the exposure control is appropriately performed.

Figure 21:
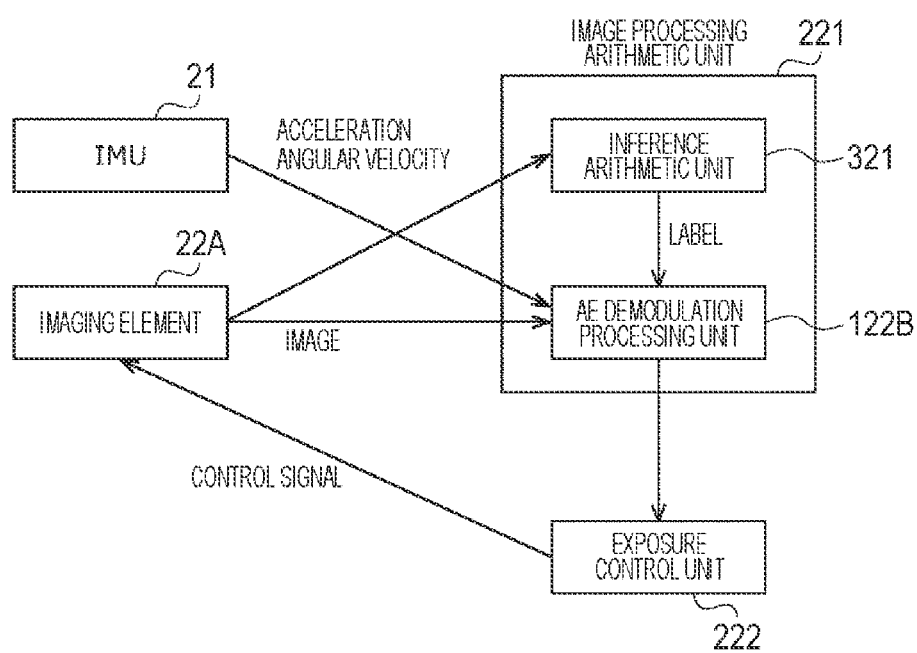
FIG. 21 is a block diagram illustrating a flow of transmission information of the exposure processing unit in FIG. 19.

FIG. 21 is a block diagram illustrating a flow of transmission information of the exposure processing unit 301 in FIG. 19.

Note that, in the figure, portions corresponding to those of the exposure processing unit 23 in FIG. 13 are denoted by the same reference numerals, and description thereof is omitted.

The exposure processing unit 301 in FIG. 21 includes an AE demodulation processing unit 122B and an exposure control unit 222.

Therefore, the exposure processing unit 301 in FIG. 17 is common to the case in FIG. 13 in including the AE demodulation processing unit 122B and the exposure control unit 222. However, the exposure processing unit 261 in FIG. 21 is different from the case in FIG. 13 in that the AE demodulation processing unit 122B acquires a sky label and a reliability probability from an inference arithmetic unit (sky detection unit) 321.

The inference arithmetic unit 321 represents the sky detection unit 321 in FIG. 19 and performs arithmetic processing using a machine learning model.

The AE demodulation processing unit 122B acquires an image from the imaging element 22A, and acquires acceleration and angular velocity from the IMU 21. Based on these pieces of information, the AE demodulation processing unit 122B calculates the luminance determination weight $w_i$ for calculating the weighted sum of the block integral values of the blocks B00 to B22 in the photometry area, and calculates the bipolar determination value Da, the luminance determination value Db, and the horizontal determination value Dc for calculating the sky determination weight $w_{sky}$, similarly to the case of FIG. 13.

Furthermore, the AE demodulation processing unit 122B calculates a sky label determination value De by acquiring a sky label and a reliability probability from the inference arithmetic unit (sky detection unit) 321. The AE demodulation processing unit 122B sets the sky label determination value De as one factor for calculating the sky determination weight $w_{sky}$. As a result, the certainty of the sky determination weight $w_{sky}$ is improved.

(Processing Procedure of Exposure Processing Unit 301)

Figure 22:
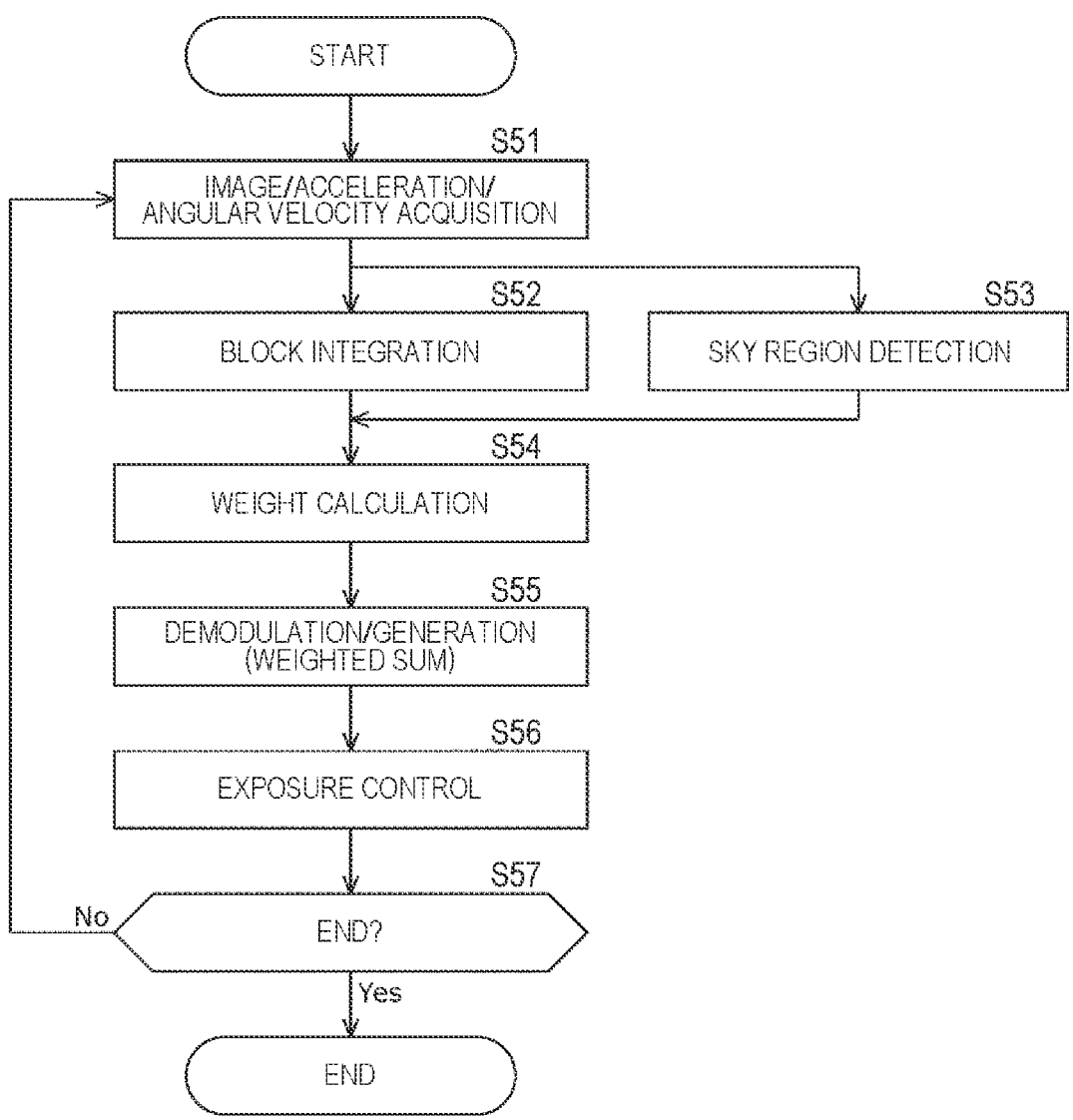
FIG. 22 is a flowchart illustrating a procedure of processing performed by the exposure processing unit in FIG. 19.

FIG. 22 is a flowchart illustrating a procedure of processing performed by the exposure processing unit 301 in FIG. 19.

In FIG. 22, in step S51, the exposure processing unit 301 acquires an image from the camera 22, and acquires acceleration and angular velocity from the IMU 21. The process proceeds from step S51 to steps S52 and S54.

In step S52, the exposure processing unit 301 calculates block integral values of the blocks B00 to B22 in the photometry area 154. The process proceeds from step S52 to step S54. The processing of steps S54 to S57 differs from the processing of steps S13 to S16 of FIG. 14 in detailed processing contents such as weight calculation contents and the like, but rough processing procedures are common, and thus description thereof is omitted.

According to the processing of the exposure processing unit 301 described above, the brightness of the ground image region contributes more strongly to the exposure control of the camera 22 than the sky image region. Therefore, it is possible to suppress a situation in which the contrast of the ground image is low and the feature points cannot be detected.

<Program>

A series of processing in the SLAM processing unit 25 and the like described above can be executed by hardware or software. In a case where the series of processing is executed by software, a program constituting the software is installed in a computer. Here, the computer includes a computer incorporated in dedicated hardware, a general-purpose personal computer capable of executing various functions by installing various programs, and the like, for example.

FIG. 23 is a block diagram illustrating a configuration example of hardware of a computer that executes the above-described series of processing by a program.

In the computer, a central processing unit (CPU) 401, a read only memory (ROM) 402, and a random access memory (RAM) 403 are mutually connected by a bus 404.

An input/output interface 405 is further connected to the bus 404. An input unit 406, an output unit 407, a storage unit 408, a communication unit 409, and a drive 410 are connected to the input/output interface 405.

The input unit 406 includes a keyboard, a mouse, a microphone, and the like. The output unit 407 includes a display, a speaker, and the like. The storage unit 408 includes a hard disk, a nonvolatile memory, and the like. The communication unit 409 includes a network interface and the like. The drive 410 drives a removable medium 411 such as a magnetic disk, an optical disk, a magneto-optical disk, a semiconductor memory, or the like.

In the computer configured as described above, for example, the CPU 401 loads a program stored in the storage unit 408 into the RAM 403 via the input/output interface 405 and the bus 404 and executes the program, whereby the above-described series of processing is performed.

The program executed by the computer (CPU 401) can be provided by being recorded in the removable medium 411 as a package medium or the like, for example. Furthermore, the program can be provided via a wired or wireless transmission medium such as a local area network, the Internet, or digital satellite broadcasting.

In the computer, the program can be installed in the storage unit 408 via the input/output interface 405 by attaching the removable medium 411 to the drive 410.

Furthermore, the program can be received by the communication unit 409 via a wired or wireless transmission medium and installed in the storage unit 408. In addition, the program can be installed in the ROM 402 or the storage unit 408 in advance.

Note that the program executed by the computer may be a program in which processing is performed in time series in the order described in the present specification, or may be a program in which processing is performed in parallel or at necessary timing such as when a call is made or the like.

The present technology can also have the following configurations.

(1)

An information processing device including:
a position/posture estimation unit that estimates a position and a posture of an imaging unit or a mobile body that moves integrally with the imaging unit on the basis of a feature point of a captured image captured by the imaging unit; and
a control unit that controls brightness of the captured image so that a ground image region included in the captured image has appropriate exposure.

(2)

The information processing device according to (1),
in which the control unit
specifies the ground image region on the basis of a gravity direction on the captured image.

(3)

The information processing device according to (2),
in which the control unit
detects the gravity direction on the captured image on the basis of information from an inertial sensor that moves integrally with the imaging unit.

(4)

The information processing device according to any one of (1) to (3),
in which the control unit
sets a weight coefficient for each of a plurality of blocks in a photometry area including the plurality of blocks set in an image area of the captured image; and
controls brightness of the captured image on the basis of a weighted sum using the weight coefficient of a luminance value of the captured image in each of the plurality of blocks.

(5)

The information processing device according to (4),
in which the control unit
sets a weight coefficient for a block of the plurality of blocks set in the ground image region included in the captured image to a value larger than a weight coefficient for a block of the plurality of blocks set in a sky image region included in the captured image.

(6)

The information processing device according to (4) or (5), in which the control unit specifies a block set in the ground image region among the plurality of blocks on the basis of the gravity direction on the captured image, and sets a weight coefficient for each of the plurality of blocks according to a difference between a luminance value of the captured image in each of the plurality of blocks and a reference value, using a luminance value of the captured image in the block set in the ground image region as the reference value.

(7)

The information processing device according to (6), in which the control unit sets the weight coefficient smaller as the luminance value of the captured image in each of the plurality of blocks is larger than the reference value.

(8)

The information processing device according to any one of (4) to (7), in which the control unit sets a luminance value of the captured image in the block as an integral value obtained by integrating luminance values of pixels included in the block.

(9)

The information processing device according to any one of (4) to (8), in which the control unit changes the weight coefficient to a value obtained by adding the weight coefficient and 1 at a ratio of (1-certainty) to a certainty of including the sky image region in the captured image.

(10)

The information processing device according to (9), in which the certainty is a value based on any one or more of a binarization determination value related to polarization of luminance of the captured image, a luminance determination value related to a magnitude of the luminance of the captured image, a horizontal determination value related to an inclination of the imaging unit, a depth determination value related to a depth of a subject, and a sky label determination value related to a reliability probability for a sky region detected by a machine learning model.

(11)

The information processing device according to (10), in which the control unit calculates the binarization determination value on the basis of the weight coefficient for the block set at a position symmetrical with a center of the captured image as a symmetric point with respect to the block set in the ground image region included in the captured image.

(12)

The information processing device according to (10) or (11), in which the control unit calculates the luminance determination value on the basis of a luminance value of the captured image in the block set at a position symmetrical with a center of the captured image as a symmetrical point with respect to the block set in the ground image region included in the captured image.

(13)

The information processing device according to any one of (10) to (12), in which the control unit calculates the horizontal determination value on the basis of an angle corresponding to an imaging direction of the imaging unit.

(14)

The information processing device according to any one of (11) to (13), in which the control unit acquires, from a distance measuring sensor, a depth in the block set at a position symmetrical with a center of the captured image as a symmetric point with respect to the block set in the ground image region included in the captured image, and calculates the depth determination value on the basis of depth information acquired.

(15)

The information processing device according to any one of (1) to (14), in which the control unit controls brightness of the captured image by exposure time or gain control of the imaging unit.

(16)

An information processing method in which an information processing device includes: a position/posture estimation unit; and a control unit, in which the position/posture estimation unit estimates a position and a posture of an imaging unit or a mobile body that moves integrally with the imaging unit on the basis of a feature point of a captured image captured by the imaging unit, and the control unit controls brightness of the captured image so that a ground image region included in the captured image has appropriate exposure.

(17)

A program for causing a computer to function as: a position/posture estimation unit that estimates a position and a posture of an imaging unit or a mobile body that moves integrally with the imaging unit on the basis of a feature point of a captured image captured by the imaging unit; and a control unit that controls brightness of the captured image so that a ground image region included in the captured image has appropriate exposure.

REFERENCE SIGNS LIST

1 Position/posture estimation system
22 Camera
23 Exposure control unit
24 Map storage unit
25 SLAM processing unit
41 INS processing unit
43 Movement trajectory calculation unit
45 Position/posture estimation unit
46 Filter processing unit
121 Exposure control unit
122 AE demodulation processing unit
141 Block integration unit
142 Weight calculation unit
143 Exposure calculating unit

The invention claimed is:

1. An information processing device comprising: a position/posture estimation unit configured to estimate a position and a posture of an imaging unit or a mobile body that moves integrally with the imaging unit based on a feature point of a captured image captured by the imaging unit; and a control unit configured to control brightness of the captured image so that a ground image region included in the captured image has appropriate exposure, set a weight coefficient for each of a plurality of blocks in a photometry area including the plurality of blocks set in an image area of the captured image, and specify a block set in the ground image region among the plurality of blocks, wherein the control unit sets the weight coefficient for each of the plurality of blocks based on the specified block set in the ground image region, and wherein the position/posture estimation unit and the control unit are each implemented via at least one processor.

2. The information processing device according to claim 1, wherein the control unit specifies the ground image region based on a gravity direction on the captured image.

3. The information processing device according to claim 2, wherein the control unit is further configured to detect the gravity direction on the captured image based on information from an inertial sensor that moves integrally with the imaging unit.

4. The information processing device according to claim 1, wherein the control unit controls the brightness of the captured image based on a weighted sum using the weight coefficient of a luminance value of the captured image in each of the plurality of blocks.

5. The information processing device according to claim 4, wherein the control unit sets a weight coefficient for a block of the plurality of blocks set in the ground image region included in the captured image to a value larger than a weight coefficient for a block of the plurality of blocks set in a sky image region included in the captured image.

6. The information processing device according to claim 4, wherein the control unit specifies the block set in the ground image region among the plurality of blocks based on the gravity direction on the captured image, and sets the weight coefficient for each of the plurality of blocks according to a difference between a luminance value of the captured image in each of the plurality of blocks and a reference value, using a luminance value of the captured image in the block set in the ground image region as the reference value.

7. The information processing device according to claim 6, wherein the control unit sets the weight coefficient smaller as the luminance value of the captured image in each of the plurality of blocks is larger than the reference value.

8. The information processing device according to claim 4, wherein the control unit sets a luminance value of the captured image in the block as an integral value obtained by integrating luminance values of pixels included in the block.

9. The information processing device according to claim 4, wherein the control unit changes the weight coefficient to a value obtained by adding the weight coefficient and 1 at a ratio of (1-certainty) to a certainty of including the sky image region in the captured image.

10. The information processing device according to claim 9, wherein the certainty is a value based on any one or more of a bipolar determination value related to polarization of luminance of the captured image, a luminance determination value related to a magnitude of the luminance of the captured image, a horizontal determination value related to an inclination of the imaging unit, a depth determination value related to a depth of a subject, and a sky label determination value related to a reliability probability for a sky region detected by a machine learning model.

11. The information processing device according to claim 10, wherein the control unit calculates the bipolar determination value based on the weight coefficient for the block set at a position symmetrical with a center of the captured image as a symmetric point with respect to the block set in the ground image region included in the captured image.

12. The information processing device according to claim 10, wherein the control unit calculates the luminance determination value based on a luminance value of the captured image in the block set at a position symmetrical with a center of the captured image as a symmetrical point with respect to the block set in the ground image region included in the captured image.

13. The information processing device according to claim 10, wherein the control unit calculates the horizontal determination value based on an angle corresponding to an imaging direction of the imaging unit.

14. The information processing device according to claim 10, wherein the control unit acquires, from a distance measuring sensor, a depth in the block set at a position symmetrical with a center of the captured image as a symmetric point with respect to the block set in the ground image region included in the captured image, and calculates the depth determination value based on depth information acquired.

15. The information processing device according to claim 1, wherein the control unit controls the brightness of the captured image by exposure time or gain control of the imaging unit.

16. An information processing method implemented via an information processing device including a position/posture estimation unit and a control unit, the method comprising:

estimating a position and a posture of an imaging unit or a mobile body that moves integrally with the imaging unit based on a feature point of a captured image captured by the imaging unit;

controlling brightness of the captured image so that a ground image region included in the captured image has appropriate exposure;

setting a weight coefficient for each of a plurality of blocks in a photometry area including the plurality of blocks set in an image area of the captured image; and specifying a block set in the ground image region among the plurality of blocks, wherein the weight coefficient is set for each of the plurality of blocks based on the specified block set in the ground image region.

17. A non-transitory computer-readable storage medium having embodied thereon a program, which when executed by a computer causes the computer to execute a method, the method comprising:

estimating a position and a posture of an imaging unit or a mobile body that moves integrally with the imaging unit based on a feature point of a captured image captured by the imaging unit;

controlling brightness of the captured image so that a ground image region included in the captured image has appropriate exposure;

setting a weight coefficient for each of a plurality of blocks in a photometry area including the plurality of blocks set in an image area of the captured image; and specifying a block set in the ground image region among the plurality of blocks, wherein the weight coefficient is set for each of the plurality of blocks based on the specified block set in the ground image region.

* * * * *